United States Patent
Inoue et al.

[11] Patent Number: 5,463,022
[45] Date of Patent: Oct. 31, 1995

[54] N-ACETYLCARBOXYMETHYLCHITOSAN DERIVATIVES AND PROCESS FOR PREPARATION THEREOF

[75] Inventors: Kazuhiro Inoue, Funabashi; Teruomi Ito, Matsudo; Satoshi Okuno, Misato; Katsutoshi Aono, Nara, all of Japan

[73] Assignee: Drug Delivery System Institute, Ltd., Tokyo, Japan

[21] Appl. No.: 969,307

[22] PCT Filed: Aug. 16, 1991

[86] PCT No.: PCT/JP91/01101

§ 371 Date: Feb. 16, 1993

§ 102(e) Date: Feb. 16, 1993

[87] PCT Pub. No.: WO92/03480

PCT Pub. Date: Mar. 5, 1992

[30] Foreign Application Priority Data

Aug. 17, 1990 [JP] Japan .................................. 2-215803

[51] Int. Cl.⁶ .......................... A61K 38/00; C07K 9/00; C08B 37/00; C07G 17/00
[52] U.S. Cl. .......................... 530/322; 536/20; 536/124
[58] Field of Search .................... 530/322; 536/20, 536/124

[56] References Cited

U.S. PATENT DOCUMENTS

| | | | |
|---|---|---|---|
| 4,528,283 | 7/1985 | Lang et al. | 514/55 |
| 4,619,995 | 10/1986 | Hayes | 536/20 |
| 4,760,135 | 7/1988 | Diedrich et al. | 536/17.9 |

FOREIGN PATENT DOCUMENTS 0342557  11/1989  European Pat. Off.

OTHER PUBLICATIONS

Jolivet et al, New Engl. J. Med. vol. 309 p. 1094 (1983).
Macromolecules, "Studies on Chitin. 13. New Polysaccharide/Polypeptide Hybrid Materials Based on Chitin and Poly(γ–methyl L–glutamate)", Kurita et al., vol. 21, No. 6, Jun. 1988.
JP–A–61236729 (Sumitomo) Oct. 22, 1986—Abstract.

*Primary Examiner*—Jill Warden
*Assistant Examiner*—Sheela J. Huff
*Attorney, Agent, or Firm*—Larson & Taylor

[57] ABSTRACT

N-acetylcarboxymethylchitosan derivatives are provided by the present invention. They are represented by the following formula (I):

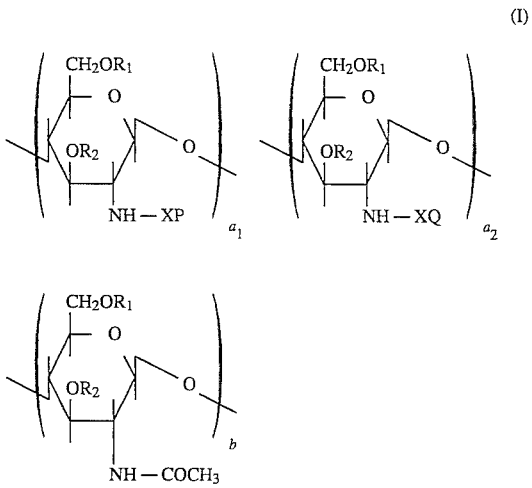

wherein $R_1$ and $R_2$ individually mean H or carboxymethyl group; P denotes a group $R_3CO—$, a group $R_4NH—$ or a group $R_5O—$ with assuming that $R_3COOH$ denotes a compound having carboxyl group, $R_4NH_2$ denotes a compound having amino group and $R_5OH$ denotes an alcohol compound; Q stands for H or a group $—OH$; X represents a peptide chain containing same or different, one to ten amino acids; $a_1$ and $a_2$ individually represent zero or a positive integer, provided that both of $a_1$ and $a_2$ are not zero at the same time, and b stands for a positive integer; and having the following characteristic values (1)–(4):

| | |
|---|---|
| (1) carboxymethylation degree: | 0.5–1.2 |
| (2) molecular weight (as measured by gel filtration method): | 3,000–300,000 |
| (3) a/(a + b): [provided that a = $a_1$ + $a_2$] | 0.01–1 |
| (4) P/X ratio (molar ratio): | 0.1–1 |

P in the formula (I) can be the residue of a pharmaceutical compound. In this case, the substances of the formula (I) are derivatives of the pharmaceutical compound, which derivatives have been improved in the properties such as organotropism in vivo.

P in the formula (I) can also be protective groups. In this case, removal of the protective groups from the substances of the formula (I) by deprotection makes it possible to provide such N-acetylcarboxymethylchitosan derivative which is useful as carrier for pharmaceutical compounds and which has the terminals of the so deprotected peptide chains capable of being linked with a pharmaceutical compound.

There are further obtained such derivatives of the substances of the formula (I), in which derivatives some of the N-acetylcarboxymethylglucosamine units have been replaced by units having a high solubility in water.

11 Claims, 16 Drawing Sheets

N-ACETYLCARBOXYMETHYLCHITOSAN DERIVATIVES AND PROCESS FOR PREPARATION THEREOF

TECHNICAL FIELD

This invention relates to novel N-acetylcarboxymethylchitosan derivatives or N-acetylated carboxymethylchitosan derivatives and processes for the preparation thereof. More specifically, the present invention is concerned with an in vivo targeting technique for medical or pharmaceutical compounds, and thus concerned with novel N-acetylcarboxymethylchitosan derivatives which are useful as polysaccharide-type of high-molecular carriers utilizable for enhancing the stability of pharmaceutical compounds in blood, the organotropism of pharmaceutical compound and the biodegradability of medicinal product prepared. This invention also pertains to novel N-acetylcarboxymethylchitosan derivatives in the form of complexes as linked to the pharmaceutical compounds.

BACKGROUND ART

Use of water-soluble, high-molecular substances as the carriers for drugs, namely, pharmaceutical compounds has been attempted to date especially in the field of pharmaceutical preparations, and a number of related techniques have been provided. These water-soluble, high-molecular substances as the drug carriers are already known widely. In many instances, a cellulose derivative such as carboxymethylcellulose, hydroxypropylcellulose or hydroxypropylmethylcellulose is used. However, these conventional techniques are concerned with so-called sustained release of drugs and have not been developed to techniques for delivery of a drug to a tissue where the drug is required, when necessary, only in an amount as needed. It is the current situation that no satisfactory technique has been developed yet for using a water-soluble, high-molecular substance as a carrier for delivery of the drug. For example, there are the below-described publications 1) and 2). The publication 1) discloses use of carboxymethylchitin as a fine particulate carrier of the implanted type, whereas the publication 2) discloses use of carboxylated dextran as a carrier for the formation of its complex with a drug.

1) WATANABE, K. et al., "Chem. Pharm. Bull.," 38, 506–509, (1990), and

2) SEZAKI, Hitoshi, "Yakugaku Zasshi,: 109, 611–621, (1989)

Although the technique disclosed in the publication 1) perceived the gelling ability and the in vivo biodegradability of carboxymethylchitin and makes use of these properties, carboxymethylchitin is of the type which is implanted to a particular local site in the body so that this technique does not go beyond the boundary of the controlled release of a drug and is not expected to enhance the organotropism of a drug to a target cancer tissue or a target organ. On the other hand, the drug complexes disclosed in the publication 2) suggests the possibility of excellent drug-delivery, but functional groups of said carboxylated dextran which are usable for the molecular modification of drug-complexes to facilitate the delivery of drugs are limited to alcoholic hydroxyl groups.

Reflecting the development of an increasing number of the anticancer agents, brain disease-curing drugs and the like, there is an outstanding need for the urgent establishment of targeting technology for these drugs with using a water-soluble, high-molecular substance. Nevertheless, the prior art techniques have not brought about any fully satisfactory solution.

To complete a targeting technique for drugs, namely, pharmaceutical compounds, by using a water-soluble, high-molecular carrier, it is necessary as prerequisites therefor, firstly that a complex of carrier with a drug remains stable in blood after its administration by intravenous injection until its arrival at a target organ, in other words, the drug can be maintained at a necessary concentration in blood, secondly that the carrier is subjected to gradual degradation in the body and consequently the carrier does not remain for a long time in the human body, and thirdly that the carrier as linked to the drug in the form of the complex exhibits by itself the tendency of an organotropism in vivo. Therefore a carrier must be provided, first of all, as one being capable of meeting these requirements all together.

DISCLOSURE OF THE INVENTION

With a view toward overcoming such problems, the present inventors have proceeded with a variety of investigations. As a result, the present inventors have now succeeded in synthesizing as novel substances certain N-acetylcarboxymethylchitosan derivatives, namely N-acetylated carboxymethylchitosan derivatives, by introducing an N-peptide chain and N-acetyl group into amino groups of such a depolymerised carboxymethylchitosan, which has been obtained by subjecting the aforementioned carboxymethylchitin to enzymatic treatment and alkali treatment. In addition, we, the present inventors, have unexpectedly found that these N-acetylcarboxymethylchitosan derivatives are useful as carriers capable of satisfying the different requirements described above and also that their use can achieve the above objects. It has also been revealed that the selection of suitable peptide chains as said N-peptide chain to be introduced will enable to broaden the range of applicable pharmaceutical compounds to the wide range of compounds having carboxyl group, compounds having amino group, and alcoholic compounds and, moreover, can provide the resulting complexes with a tendency of the organotropism in vivo to a particular organ. This invention has been completed based on these findings.

The present invention will hereinafter be described in detail.

Novel substances according to the present invention are N-acetylcarboxymethylchitosan derivatives represented by a general formula (I) given below. These novel derivatives are characterized as one of their features by that the hydrogen atoms of some of the 6-hydroxyl and/or 3-hydroxyl groups of glucosamine, which is the constituent sugar unit of the chitosan of said derivatives, have been replaced by carboxymethyl groups; the hydrogen atoms of the 2-amino groups present in some of the sugar units have been replaced by acetyl groups; and the hydrogen atoms of the 2-amino groups present in other some of the sugar units have been replaced by peptide chains or amino acids.

A novel N-acetylcarboxymethylchitosan derivative according to the first aspect of the present invention is represented by the following general formula (I):

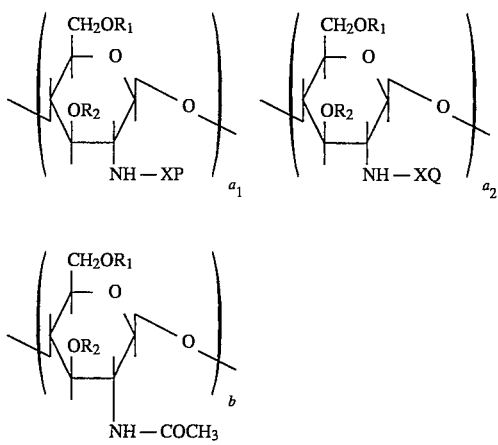

(I)

In the formula (I), $R_1$ and $R_2$ individually mean H or carboxymethyl group with the proviso that they do not stand for H at the same time.

Further, in the above formula, P denotes a group $R_3CO$—, a group $R_4NH$— or a group $R_5O$—. Here, in an instance, P may be linked to an N-terminal amino acid of an N-peptide chain which is the peptide attached to the 2-amino group of the glucosamine moiety and is represented by X. In this case, P means the group $R_3CO$—. In another instance, P may be linked to a C-terminal amino acid of said N-peptide chain as represented by X, and in this instance P may mean the group $R_4NH$— or the group $R_5O$—. In the above, it is assumed that $R_3COOH$ denotes a compound having carboxyl group, that is, a compound of carboxylic acid-type, $R_4NH_2$ denotes a compound having amino group and $R_5OH$ denotes an alcohol compound.

Described specifically, in many instances, the $R_3CO$— group can be a protective group for an amino group, or an acyl group originated from a pharmaceutical compound of the carboxylic acid-type. Illustrative examples of such amino-protecting groups include alkoxycarbonyl groups such as tert-butoxycarbonyl, and aralkyloxycarbonyl groups such as p-methoxybenzyloxycarbonyl. As an alternative, the $R_3CO$— group can also be such a group that its corresponding $R_3COOH$ denotes a pharmaceutical or drug compound of the carboxylic acid-type, for example, methotrexate.

Examples of the $R_5O$— group include lower alkoxyl groups useful as protective groups for carbonyl group, for example, t-butyloxy; and aralkyloxy groups, for example, benzyloxy. As an alternative, the $R_5O$— group can be such a residue which is formed by removing H from the alcoholic hydroxyl group of an alcohol-type pharmaceutical compound $R_5OH$.

The $R_4NH$— group can be a protective group of the amido-type for protecting carboxyl group, for example, a lower alkylimino group such as methylimino. As an alternative, the $R_4NH$— group can be such a group that its corresponding $R_4NH_2$ represents a pharmaceutical compound of the type of compounds having amino group(s), for example, daunorubicin or triprolidine.

Q stands for H or a group —OH. Q may be bonded to the N-terminal amino acid of the N-peptide chain as represented by X. In this case, Q means H. In another case, Q may alternatively be bonded to the C-terminal amino acid of the N-peptide chain as represented by X, wherein Q means the group —OH.

Further, X in the formula (I) represents a peptide chain containing same or different, one to ten amino acid(s). Here, it is to be noted that a single amino acid is also interpreted as being embraced by the peptides in this specification. This "peptide chain" should be interpreted as embracing not only such peptide chains composed of amino acids alone, but also such peptide chains comprising amino acids and containing one or more compounds different from the amino acids in part(s) of the peptide chain. In the latter case, the different compound(s) may be a dibasic acid, especially a dibasic carboxylic acid such as succinic acid which can be interposed and connected to an intermediate or terminal amino acid(s) in the peptide chain so that peptide chain(s) containing same or different amino acids is or are constructed as a whole consequence.

In addition, the N-acetylcarboxymethylchitosan derivative represented by the formula (I) includes its salts, especially alkali metal salts at the carboxymethyl group of said derivative, for example, the sodium, potassium and ammonium salts.

In the derivative having the formula (I) according to the first aspect of this invention, the number of amino acids forming the peptide chain X may be generally 1–4 in account of release of the drug compound and antigenicity of the derivative, with 3–4 amino acids being particularly preferred. The followings are examples of the moiety XP in such cases where the peptide chain X present in XP in the formula (I) represents a peptide chain composed of 1–4 amino acids alone and P is linked to the N-terminal amino acid of the peptide chain. In such cases, the peptide bond existing in the peptide chain X is in the form of —NHCO— as viewed from the side of the chitosan unit.

P-Phe-Phe-Gly-,

P-Gly-Phe-Gly-Gly-,

P-Phe-Gly-Phe-Gly-,

P-Gly-Phe-Gly-Phe-,

P-Gly-Gly-Gly-, and

P-Ala-Gly-Gly-Gly-.

The followings are examples of the moiety XP in such instances where the peptide chain X present in XP represents a peptide chain containing a dibasic acid and 1–4 amino acids and P is linked to the C-terminal amino acid of the peptide chain. In such instances, the peptide bond existing in the peptide chain X is in the form of —CONH— as viewed from the side of the chitosan unit.

-Suc-Ala-Ala-Ala-P, and

- Suc-Ala-Ala-Val-Ala-P in which Suc represents the residue of succinic acid. Further, other illustrative examples of the amino acid sequences usable for the peptide chain X in accordance with this invention include:

(i) H-Gly-Gly-Gly-Val-Ala-OH, -Gly-Gly-Gly-Leu-Ala-, -Gly-Gly-Phe-Leu-Gly-, -Gly-Gly-Phe-Try-Ala-, -Gly-Gly-Gly-Gly-Gly-, (ii) -Gly-Gly-Gly-Phe-Leu-Gly-, -Gly-Gly-Gly-Gly-Leu-Ala-, -Gly-Gly-Gly-Gly-Gly-Gly, (iii) -Gly-Gly-Gly-Gly-Phe-Leu-Gly-, -(Gly)$_7$-, -(Gly)$_5$-Lue-Ala-, (iv) —(Gly)$_5$-Phe-Leu-Gly, -(Gly)$_8$-, (v) -(Gly)$_9$-, and (vi) -(Gly)$_{10}$-.

The followings are illustrative examples of parent drug compounds from which the residue (P-) of the pharmaceutical compound usable in this invention can be derived:

Methotrexate, levadopa, bumetanide, furosemide, dinoprost, daunorubicin, doxorubicin, mitomycin C, triprolidine, acriflavinum, etc.

Further, the compound of the formula (I) according to the first aspect of this invention is characteristically specified by its carboxymethylation degree, molecular weight (as measured by gel filtration method), values of the ratio a/(a+b) and ratio P/X(molar ratio).

The carboxymethylation degree is determined by colloidal titration or alkalimetry of the compound of the formula (I) in this invention. With respect to the method for colloidal titration, reference is made to the following publication 3):

3) OKIMASU, Satoru, "Journal of the Society of Agricultural Chemistry", 32, 303–308, (1958)

In the present invention, the molecular weight of the compound of the formula (I) according to this invention is determined by gel filtration method with using a dextran as standard substance. In Examples given hereinafter, the molecular weight of the compound of the formula (I) and others was measured using a column of "TSK-gel G4000PW$_{XL}$" as eluted with aqueous 0.1M sodium chloride solution fed at a flow rate of 0.8 ml/minute and at a column temperature of 40° C. while detecting by means of differential refractometer.

The above-mentioned value of a/(a+b) is a value which may be called, e.g., "peptide-introducing degree". In this value, a represents the sum of the number $a_1$ of sugar units as substituted by —XP plus the number $a_2$ of sugar units as substituted by —XQ, and b stands for the number of acetyl-substituted sugar units. Each of the sugar units of the compound of the formula (I) is substituted either by —XP, or by —XQ or by the acetyl group so that a+b indicates the total number of the sugar units in the molecule of said compound.

Incidentally, a/(a+b) is determined by the following equation (1):

$$\frac{A}{M_m} \div \frac{100 - (A + C)}{M_s} \quad (1)$$

wherein A means the content (wt. %) of P in the compound of the formula (I); $M_m$ represents the molecular weight of P; $M_s$ denotes the average molecular weight of the sugar units of N-acetylcarboxymethylchitosan; and C stands for the content (wt. %) of X (when $a_2$=0) in the compound of formula (I). C is calculated in accordance with the following equation (2):

$$C=B(100-A)\times10^{-2} \quad (2)$$

wherein B represents the content (wt. %) of X (when $a_1$=0) in the compound of formula (I). B can be determined by measuring the content of the peptide, for example, after the introduction of peptide but before the introduction of P or after removing P from the compound of the formula (I). If the amino acids in X show a characteristic absorption, this can be used to determine B directly by absorption spectrophotometry. If the amino acid(s) in X does not have any characteristic absorption, however, B can be determined in accordance with the following equation (3).

$$B = \frac{D}{r(100 - D) + D} \times 100 \quad (3)$$

wherein D represents the content (wt. %) of XP (when $a_2$=0) in the compound of formula (I). If P has a characteristic absorption, this can be used to determine D by absorption spectrophotometry. Further, r indicates a value determined by the following equation (4):

$$r=M_{PX}/M_X \quad (4)$$

wherein $M_{PX}$ and $M_X$ represent the molecular weights of XP and X, respectively.

Next, the molar ratio P/X is a value which may be called, for example, a degree of introducing pharmaceutical compound (P) into the peptide (or termed as degree of substitution with P), and which is corresponding to a value of $a_1/(a_1+a_2)$. The molar ratio P/X can be determined in accordance with the following equation (5):

$$\frac{A}{M_m} \div \frac{C}{M_x} \quad (5)$$

In the compound of formula (I) according to the first aspect of this invention, the carboxymethylation degree, molecular weight (as measured by gel filtration method), the a/(a+b) value and the P/X value, which are calculated as described above, are in the ranges of 0.5–1.2, 3,000–300,000, 0.01–1 and 0.1–1, respectively.

In the present specification, the formula (I) does not indicate anything beyond that, in the molecule of the compound represented by the formula (I), the number of sugar units as substituted by —XP (i.e., glucosamine sugar units) is $a_1$, the number of sugar units as substituted by —XQ is $a_2$, and the number of sugar units as substituted by —COCH$_3$ is b. The formula (I) indicate neither that the substituted sugar units of each of the aforesaid types are successively bonded together as many as their corresponding number $a_1$, $a_2$ or b, nor that the sugar units of the aforesaid three types are bonded together in the sequence or order as exhibited in the formula (I).

In addition, a partially N-acetylated carboxymethylchitosan derivative which is lacking some of the N-acetyl groups originally present in the compound of formula (I) according to the first aspect of this invention is also a novel substance and has a utility, as will be described subsequently.

In a second aspect of this invention, therefore, there is thus provided a partially N-acetylated carboxymethylchitosan derivative represented by the following formula (II):

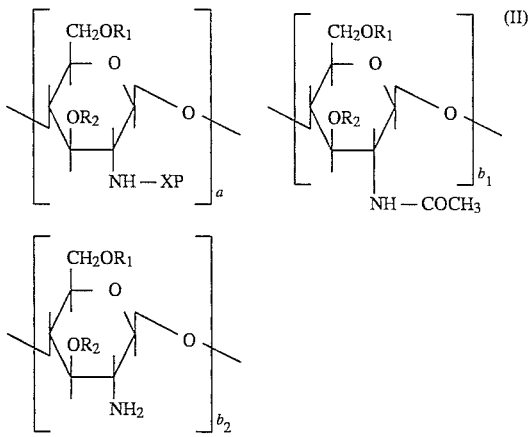

In the formula (II), $R_1$, $R_2$ and X have the same meanings as defined in the formula (I) but P is somewhat broader in its meaning than its definition as given in the formula (I). P denotes H, a group —OH, a group $R_3CO$—, a group $R_4NH$— or a group $R_5O$—. P may be linked to the N-terminal amino acid of the peptide chain X, in some instances. P stands for H or the group $R_3CO$— in this case. P may also be linked to the C-terminal amino acid of the peptide chain X, in some instances. P stands for the group —OH, the group $R_4NH$— or the group $R_5O$— in this case. a, $b_1$ and $b_2$ individually represent a positive integer.

Further, the compound of the formula (II) can also be characterized by its carboxymethylation degree and molecular weight (as measured by gel filtration method) as well as by the a/(a+b) value and the P/X molar ratio which are determined by the same methods as those referred to above with respect to the formula (I). However, b in the value a/(a+b) in the compound of formula. (II) is somewhat different in its meaning from b for the compound of the formula (I), and it represents the sum of the number $b_1$ of acetyl-substituted sugar units plus the number $b_2$ of sugar units in each of which the 2-amino group remains free without being substituted. These characteristic values of the compound of the formula (II) are in the same ranges as those of the compound having the formula (I).

In the present specification, the formula (II) does not indicate anything beyond that, in the molecule of the compound represented by the formula (II), the number of sugar units as substituted by —XP is a, the number of sugar units as substituted by —$COCH_3$ is $b_1$, and the number of sugar units having the 2-amino groups remaining free and unsubstituted is $b_2$. The formula (II) indicate neither that the sugar units of each of the aforesaid three types are successively bonded together as many as their corresponding number a, $b_1$ or $b_2$, nor that the sugar units of the three types are bonded together in the sequence or order as shown in the formula (II).

The compound of the formula (II) may be an intermediate useful for synthetizing and preparing the substance of the formula (I) and, accordingly, has the industrial applicability and principal structure of the compound same as the compound of the formula (I).

For example, the compound of the formula (II) where P is the residue $R_3CO$—, $R_4NH$— or $R_5O$— derived from a pharmaceutical compound is able to afford the compound of the formula (I) in the form of the complex linked to the pharmaceutical compound, when the amino groups of the former compound (II) as such are acetylated with acetic anhydride or another suitable acetylating agent such as acetyl chloride in an appropriate solvent, for example, pyridine. The compound of the formula (I) according to the present invention can also be produced if $R_3COOH$, $R_4NH_2$ or $R_5OH$ useful as a pharmaceutical compound is either made to be linked to the compound of the formula (II) after removal of the protective groups from the compound of the formula (II) where Ps have been the protective groups, or if such $R_3COOH$, $R_4NH_2$ or $R_5OH$ is made to be linked directly to the compound of formula (II) where Ps are Hs or —OH, followed by acetylation of the remaining amino groups as described above.

BRIEF DESCRIPTION OF THE DRAWINGS

In the accompanying drawings.

DETAILED DESCRIPTION OF THE PREFERRED EMBODIMENTS

Figure 1:
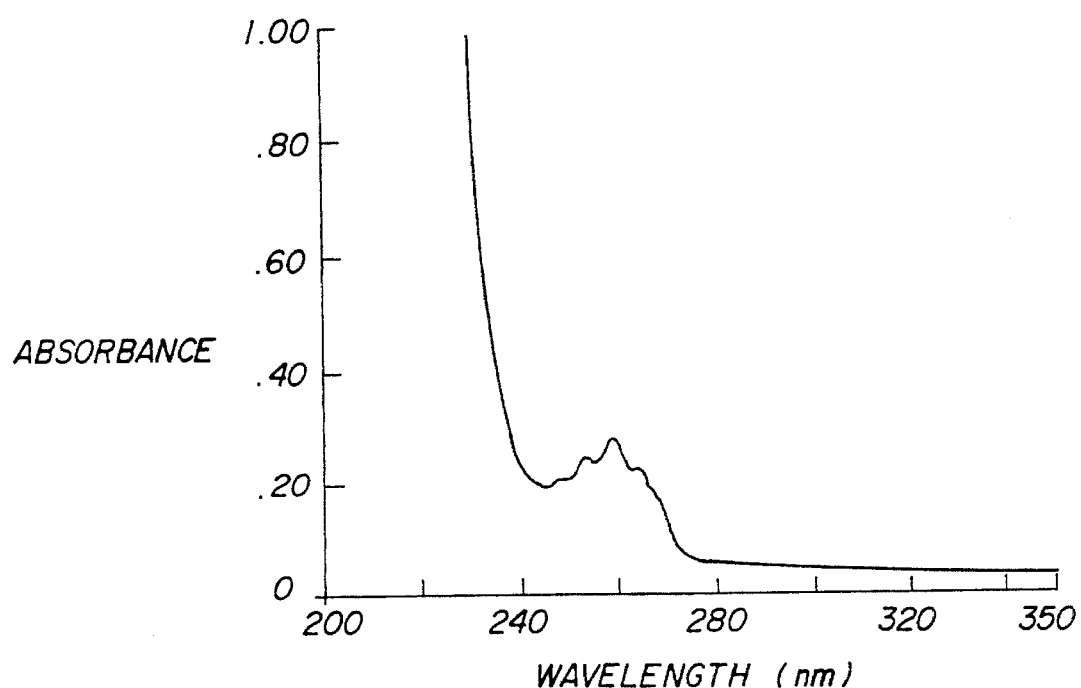
FIG. 1 shows an ultraviolet absorption spectrum of the N-acetylcarboxymethylchitosan—Gly-Phe-Phe-Boc complex as obtained in Example 1 of this invention (at a concentration of the complex of 1900 μg/ml in 30% aqueous ethanol as solvent)

A description will next be made of the preparation of the compound of formula (I) according to the first aspect of this invention. Although it can be outlined as will be described below, the present invention is not be limited to the following preparation method.

Carboxymethylchitin, one of the starting materials for production of the new substance of this invention, can be easily prepared by reacting, in the presence of an alkali, monochloroacetic acid with chitin (namely, β-1, 4-poly-N-acetylglucosamine) which is found widely in cruschymata such as crabs, shrimps and lobsters, shells of insects, cell walls of fungi, and the like. By modifying the reaction conditions, carboxymethylchitin can be obtained with varying carboxymethylation degrees. Commercial products can also be used.

Next, carboxymethylchitin is reduced in its molecular weight, namely, degraded or depolymerized. The molecular weight of the resulting depolymerized carboxymethylchitin can be regulated, for example, by causing egg white lysozyme to act on a commercially available carboxymethylchitin under controlled reaction conditions upon depolymerization of the commercially available carboxymethylchitin. The reaction conditions therefor also can vary depending on the carboxymethylation degree (ds: carboxymethylation degree per sugar residue) of carboxymethylchitin to be employed. Where the value of ds is 1.0, for example, a depolymerized carboxymethylchitin having a molecular weight reduced to about $1 \times 10^5$ can be obtained by reacting carboxymethylchitin, whose molecular weight is about $1 \times 10^6$ or so, with about 1/400 volume of egg white lysozyme at pH 6.0 and 37° C. for about 2 hours.

The carboxymethylchitin so depolymerized is further subjected to de-N-acetylation. This can be achieved by alkali treatment. By dissolving the depolymerized carboxymethylchitin, for example, in 1N NaOH and heating the resulting mixture under reflux at 100° C. for several hours to several tens hours, preferably 3–8 hours, the N-acetyl groups are partially removed therefrom so that carboxymethylchitosan having some N-acetyl groups still remaining therein is obtained. The carboxymethylchitosan so formed will be called "partially N-acetylated carboxymethylchitosan".

The partially N-acetylated carboxymethylchitosan is next dissolved, for example, in a mixed solvent of dimethylformamide and 0.5% aq. $NaHCO_3$ solution, followed by adding thereto an N-hydroxysuccinimido ester of such a peptide which is usable in this invention and which peptide has had a protective group introduced into the amino group of the terminal amino acid of the peptide chain and will hereinafter be called simply the "protected peptide" that can be represented by a formula: "HO—X— protective group". Said N-hydroxysuccinimido ester is an active ester of the protected peptide. They are reacted with each other so that the "protected peptide" can be linked to the free amino groups of the partially N-acetylated carboxymethylchitosan. By changing the amount of the active ester of the "protected peptide" to be added, a complex of "partially-N-acetylated-carboxymethylchitosan-protected peptide" having the protected peptide linked in varying amounts can be formed. If the active ester of the protected peptide is reacted in a large excess, it is possible to obtain a complex where the free amino groups do not exist practically. The active ester of the protected peptide can be obtained in a manner known per se in the field of peptide synthesis, for example, by dissolving the protected peptide in dimethylformamide, adding N-hydroxysuccinimide and N,N'-dicyclohexylcarbodiimide to the solution and then reacting them.

The concentration of the partially N-acetylated carboxymethylchitosan which is employed in the reaction mixture for the above reaction linking to the active ester of the protected peptide as described above may suitably be 0.1–5% (wt. %). The molar ratio of the sugar residues of the polysaccharide (the chitosan) to the active ester of the protected peptide may appropriately range from 20:1 to 1:10. The number of amino acids present in the molecule of the protected peptide is in a range of 1–10.

When the above-mentioned linking reaction is made by using a pharmaceutical compound, namely a drug compound in place of the protective groups, that is to say, by adding the N-hydroxysuccinimido ester of such a peptide which is usable in this invention and which peptide has the drug compound introduced therein and is represented by a formula: "HO—X—P" where P denotes the residue $R_3CO—$, the residue $R_4NH—$ or the residue $R_5O—$ originated from the pharmaceutical or drug compound, there is formed a complex of "partially-N-acetylated-carboxymethylchitosan-peptide-drug".

Further, subsequent removal of the protective groups or the drug residue (—P) from the complex which has been formed as above will afford a complex of "partially-N-acetylated-carboxymethylchitosan-peptide".

The compound of the formula (II) provided according to the present invention may embrace three types of the substances as formed and as described above, and are thus the "partially-N-acetylated-carboxymethylchitosan-protected peptide" complex, the "partially-N-acetylated-carboxymethylchitosan-peptide-drug" complex, and the "partially-N-acetylated-carboxymethylchitosan-peptide" complex.

The compound of the formula (II) according to this invention can be converted to the corresponding compound of the formula (I) according to this invention when the former compound (II) is dissolved in a saturated aqueous solution of $NaHCO_3$ and is then reacted with acetic anhydride or another suitable acetylating agent, for example, acetyl chloride to acetylate the free amino groups which are remaining in the complex compound of the formula (II). However, the compound obtained here is such a compound of the formula (I) where either $a=a_1$ and $a_2=0$, or $a=a_2$ and $a_1=0$. Corresponding to the above-described three types of the compound of the formula (II), for example, a complex of "N-acetyl-carboxymethylchitosan-protected peptide", a complex of "N-acetylcarboxymethylchitosan-peptide-drug" and a complex of "N-acetylcarboxymethylchitosan-peptide" can be produced through the acetylation, respectively. The former two complexes just mentioned above are the corresponding compound of the formula (I) where $a=a_1$ and $a_2=0$, whereas the last-mentioned complex is the corresponding compound of the formula (I) where $a=a_2$ and $a_1=0$. Further, the former two complexes can be converted into the last-mentioned complex generally by acid treatment. For example, the "N-acetylcarboxymethylchitosan-peptide" complex can be produced by subjecting the corresponding "N-acetylcarboxymethylchitosan-protected peptide" complex to mild acid treatment, for example, by treating the latter complex in 0.5N HCl at 30° C. for 16 hours.

The "N-acetylcarboxymethylchitosan-peptide-drug" complex can be produced by subsequently dissolving the above described "N-acetylcarboxymethylchitosan-peptide" complex, for example, in 1% aqueous $NaHCO_3$ solution and then reacting the N-terminal of the peptide chain of the latter complex with a drug compound having the carboxyl group in the form of the N-hydroxysuccinimido ester (active ester) of the drug compound having the carboxyl group. It is however to be noted that the compound (I) as produced here is not necessarily limited to the compound of the formula (I) where $a=a_1$ and $a_2=0$ but, in practice, may be indicated as such compound of the formula (I) where $a=a_1+a_2$ and $a_2\neq0$. Thus, for instance, if methotrexate (MTX) is chosen as such drug compound here and reacted with the peptide chain of the complex, the "N-acetylcarboxymethylchitosan-peptide—MTX" complex can be produced. The content of MTX so introduced in the latter complex produced may usually be lower than the content of the peptide chain X in the complex.

In a third aspect of the present invention, therefore, there is provided a process for the preparation of a partially N-acetylated carboxymethylchitosan derivative represented by the following formula (II):

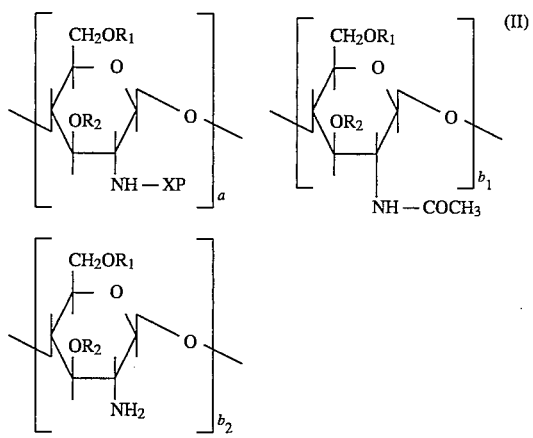

wherein $R_1$ and $R_2$ individually mean H or carboxymethyl group; P denotes H, a group OH, a group $R_3CO—$, a group $R_4NH—$ or a group $R_5O—$ with assuming that $R_3COOH$ denotes a compound having carboxyl group, $R_4NH_2$ denotes a compound having amino group and $R_5OH$ denotes an alcohol compound; X represents a peptide chain containing same or different, 1–10 amino acids; and a, $b_1$ and $b_2$ individually represent a positive integer; and having the following characteristic values (1)–(4):

| | | |
|---|---|---|
| (1) | carboxymethylation degree: | 0.5–1.2 |
| (2) | molecular weight (as measured by gel filtration method): | 3,000–300,000 |
| (3) | a/(a + b): [provided that $b = b_1 + b_2$] | 0.01–1 |

| | | |
|---|---|---|
| (4) | P/X ratio (molar ratio): | 0.1–1 | characterized in that the process comprises reacting a compound having the following formula:

PX—OH      (IV)

wherein P and X have the same meanings as defined above with a partially N-acetylated carboxymethylchitosan having the following formula (III):

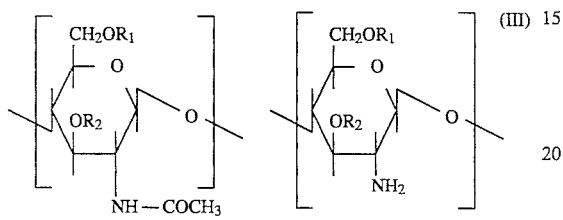

wherein $R_1$ and $R_2$ have the same meanings as defined above and having the following characteristic values (1)–(2):

| | | |
|---|---|---|
| (1) | carboxymethylation degree: | 0.5–1.2 |
| (2) | molecular weight (as measured by gel filtration method): | 3,000–300,000. |

In a fourth aspect of the present invention, there is also provided a process for the preparation of an N-acetylcarboxymethylchitosan derivative represented by the following formula (I):

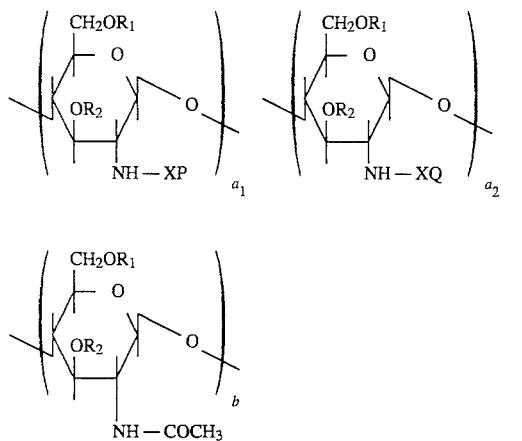

(I)

wherein $R_1$ and $R_2$ individually mean H or carboxymethyl group; P denotes a group $R_3CO$—, a group $R_4NH$— or group $R_5O$— with assuming that $R_3COOH$ denotes a compound having carboxyl group, $R_4NH_2$ denotes a compound having amino group and $R_5OH$ denotes an alcohol compound; Q stands for H or a group —OH; X represents a peptide chain containing same or different, one to ten amino acids; $a_1$ and $a_2$ individually represent zero or a positive integer, provided that both of $a_1$ and $a_2$ are not zero at the same time, and b stands for a positive integer; and having the following characteristic values (1)–(4):

| | | |
|---|---|---|
| (1) | carboxymethylation degree: | 0.5–1.2 |
| (2) | molecular weight (as measured by gel filtration method): | 3,000–300,000 |
| (3) | a/(a + b): [provided that a = $a_1 + a_2$] | 0.01–1 |
| (4) | P/X ratio (molar ratio): | 0.1–1 | characterized in that the process comprises:

acetylating a partially N-acetylated carboxymethylchitosan derivative having the following formula (II')

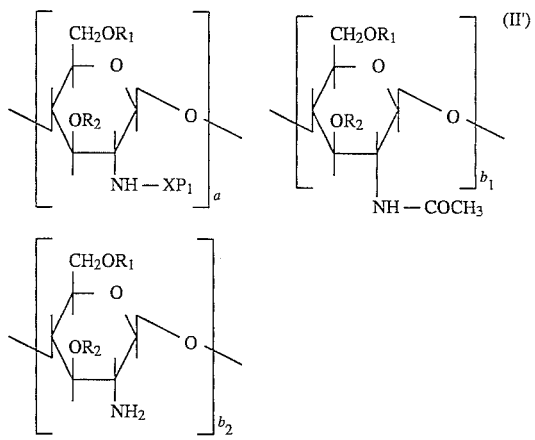

(II')

wherein $R_1$ and $R_2$ individually mean H or carboxymethyl group; $P_1$ denotes H, a group OH, a group $R_3'CO$—, a group $R_4'NH$— or a group $R_5'O$— with assuming that $R_3'COOH$ denotes a compound having carboxyl group, $R_4'NH_2$ denotes a compound having amino group and $R_5'OH$ denotes an alcohol compound; X represents a peptide chain containing same or different, one to ten amino acids; and a, $b_1$ and $b_2$ individually represent a positive integer; and having the following characteristic values (1)–(4):

| | | |
|---|---|---|
| (1) | carboxymethylation degree: | 0.5–1.2 |
| (2) | molecular weight (as measured by gel filtration method): | 3,000–300,000 |
| (3) | a/(a + b): [provided that b = $b_1 + b_2$] | 0.01–1 |
| (4) | $P_1$/X ratio (molar ratio): | 0.1–1, | removing the $P_1$ groups from the resulting acetylation product, where the $P_1$ groups are other than H or the group —OH; and reacting the resulting reaction product having the $P_1$ groups removed, with a compound of the following formula:

P—H or P—OH      (V)

wherein P means the group $R_3CO$—, the group $R_4NH$— or the group $R_5O$— as defined above.

We, the present inventors, have also proceeded with research to further improve the properties of the N-acetylcarboxymethylchitosan derivative of formula (I) according to the first aspect of this invention. As a result, we have succeeded in synthesizing as a novel substance such an N-acetylcarboxymethylchitosan derivative represented by the following formula (X):

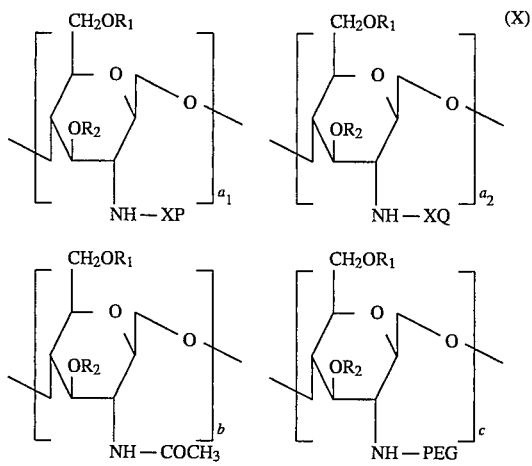
(X)

wherein $R_1$, $R_2$, P, Q and X have the same meanings as defined above in the formula (I), PEG represents a group having the following formula (VI), (VII), (VIII) or (IX):

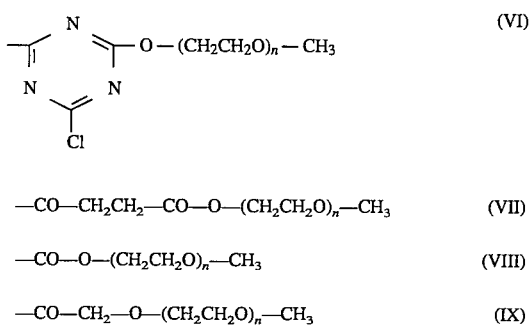

(VI)

—CO—CH₂CH₂—CO—O—(CH₂CH₂O)ₙ—CH₃ (VII)

—CO—O—(CH₂CH₂O)ₙ—CH₃ (VIII)

—CO—CH₂—O—(CH₂CH₂O)ₙ—CH₃ (IX)

in which n means the average polymerization degree of the polyethylene glycol chain; $a_1$ and $a_2$ individually represent 0 or a positive integer provided that both of $a_1$ and $a_2$ are not 0 at the same time; b and c individually stand for a positive integer; and having the following characteristic values (1)–(4):

| | |
|---|---|
| (1) carboxymethylation degree: | 0.5–1.2 |
| (2) molecular weight (as measured by gel filtration method): | 3,000–300,000 |
| (3) a/(a + b + c): [provided that a = $a_1$ + $a_2$] | 0.01–1 |
| (4) P/X ratio (molar ratio): | 0.1–1 | by replacing a plurality of the N-acetylcarboxymethylglucosamine units, namely the sugar units contained in the drivative of the formula (I), by a corresponding plurality of such carboxymethylglucosamine units having their 2-amino groups substituted with a group which possesses a polyethylene glycol chain therein (hereinafter, said group may be abbreviated simply as "PEG"), specifically by such a polyethlene-glycol-substituted carboxymethylglucosamine units having the formula (A):

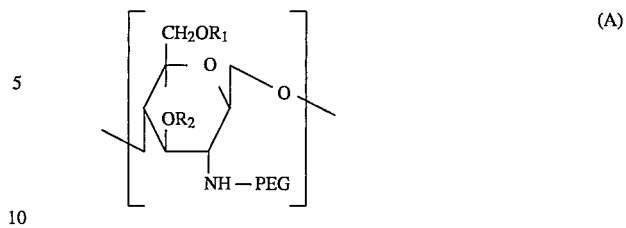
(A)

wherein $R_1$, $R_2$, PEG and n have the same meanings as defined above. Moreover, it has been found that the novel N-acetylcarboxymethylchitosan derivative represented by the formula (X) can exhibit a solubility in water as enhanced much than the N-acetylcarboxymethylchitosan derivative of the formula (I) itself, and is usable as a carrier for the delivery of a drug compound and also can reside or remain for a long time in blood after its administration.

We, the present inventors, have also succeeded in synthesizing as a novel substance such an N-acetylcarboxymethylchitosan derivative represented by the following formula (XI):

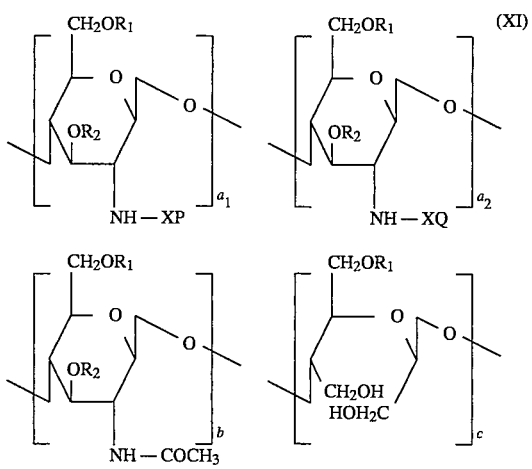
(XI)

wherein $R_1$, $R_2$, P, Q and X have the same meanings as defined above in the formula (I); $a_1$ and $a_2$ individually represent 0 or a positive integer provided that both of $a_1$ and $a_2$ are not 0 at the same time; and b and c individually stand for a positive integer; and having the following characteristic values (1)–(4):

| | |
|---|---|
| (1) carboxymethylation degree: | 0.5–1.2 |
| (2) molecular weight (as measured by gel filtration method): | 3,000–300,000 |
| (3) a/(a + b + c): [provided that a = $a_1$ + $a_2$] | 0.01–1 |
| (4) P/X ratio (molar ratio): | 0.1–1 | by replacing a plurality of the N-acetylcarboxymethylglucosamine units, namely the constituent sugar units of the derivative of the formula (I), by a corresponding plurality of polyol units having the formula (B):

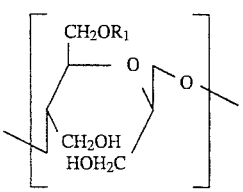
(B)

wherein $R_1$ has the same meanings as defined above. Moreover, it has been found that the novel N-acetylcarboxymethylchitosan derivative represented by the formula (XI) can exhibit a solubility in water as enhanced much than the N-acetylcarboxymethylchitosan derivative of the formula (I) itself, and is usable as a carrier for the delivery of a drug compound and can remain and retain for a long time in blood after its administration of the derivative of formula (XI).

In a fifth aspect of the present invention, therefore, there is provided an N-acetylcarboxymethylchitosan derivative represented by the following formula (X) or (XI):

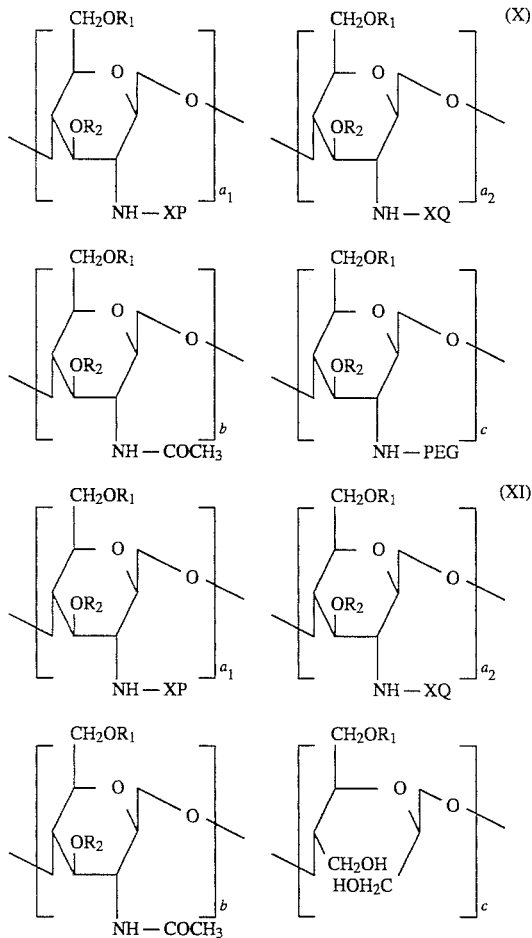

wherein $R_1$ and $R_2$ individually mean H or carboxymethyl group; P denotes a group $R_3CO-$, a group $R_4NH-$ or a group $R_5O-$ with assuming that $R_3COOH$ denotes a compound having carboxyl group, $R_4NH_2$ denotes a compound having amino group and $R_5OH$ denotes an alcohol compound; Q stands for H or a group $-OH$; X represents a peptide chain containing same or different, one to ten amino acids; $a_1$ and $a_2$ individually represent zero or a positive integer, provided that both of $a_1$ and $a_2$ are not zero at the same time; b and c individually stand for a positive integer, and -PEG represents a group having the following formula (VI), (VII), (VIII) or (IX):

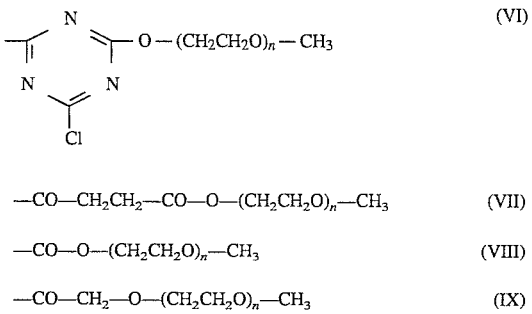

$-CO-CH_2CH_2-CO-O-(CH_2CH_2O)_n-CH_3$ (VII)

$-CO-O-(CH_2CH_2O)_n-CH_3$ (VIII)

$-CO-CH_2-O-(CH_2CH_2O)_n-CH_3$ (IX)

in which n means the average polymerization degree of the polyethylene glycol chain; and having the following characteristic values (1)–(4):

| | |
|---|---|
| (1) carboxymethylation degree: | 0.5–1.2 |
| (2) molecular weight (as measured by gel filtration method): | 3,000–300,000 |
| (3) a/(a + b): [provided that a = $a_1 + a_2$] | 0.01–1 |
| (4) P/X ratio (molar ratio): | 0.1–1 |

The derivative of the formula (X) according the fifth aspect of this invention is such an N-acetylcarboxymethylchitosan derivative of the formula (I) where some of the sugar units have been replaced by sugar units of the formula (A) given below. On the other hand, the derivative of the formula (XI) according to the fifth aspect of this invention is such an N-acetylcarboxymethylchitosan derivative where some of the sugar units have been replaced likewise by polyol units of the formula (B) given below. Examples 17–21 and Examples 22–23, which will be described hereinafter, demonstrate some examples of the compound of the formula (X) and some examples of the compound of the formula (XI), respectively.

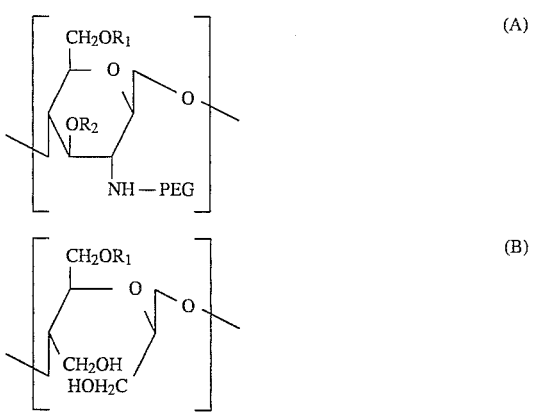

The sugar derivative of the above formula (A) is such a sugar unit in which the 2-amino group of the carboxymethylglucosamine unit has been substituted by PEG. Specifically, PEG represents one of groups having the following formulae (VI) to (IX) and containing a polyethylene gloycol chain:

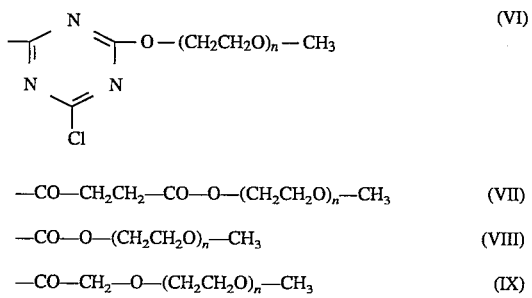

(VI)

—CO—CH₂CH₂—CO—O—(CH₂CH₂O)ₙ—CH₃ (VII)

—CO—O—(CH₂CH₂O)ₙ—CH₃ (VIII)

—CO—CH₂—O—(CH₂CH₂O)ₙ—CH₃ (IX)

The polyethlene glycol chain contained in each of the groups of the formulae (VI) to (IX) may have various molecular weights, but the polyethylene glycol chain which is preferred from the standpoint of its general availability is such that having an average molecular weight of about 5,000. Accordingly, the preferred average polymerization degree n of the polyethylene glycol chain present in each group of the formulae (VI)–(IX) is about 100–120, to which this invention is not limited, however. The content of the polyethylene glycol in the derivative of the formula (X) can be determined by an NMR method from measurement of the area of a peak attributable to methylene protons in the polyethylene glycol chain. Greater contents of the polyethylene glycol are preferred and for example, its contents of 1% (by weight) or higher are satisfactory. However, no particular limitation is imposed on the content of polyethylene glycol in this invention.

On the other hand, the polyol unit of the formula (B) in the derivative of the formula (XI) according to the fifth aspect of this invention has a chemical structural feature in that the bond between the carbon atoms at the 2-and 3-positions of the carboxymethylglucosamine unit has been cleaved by oxidation and, subsequent to the cleavage, the carboxymethylglucosamine unit has been converted into the form of a polyalcohol by reduction.

The a/(a+b+c) value in each of the derivatives of the formulae (X) and (XI) according to the fifth aspect of this invention shows the peptide-introducing degree which may be defined similarly to the a/(a+b) value for the formula (I). The a/(a+b+c) value can therefore be determined using the above equation (1) as it is. In practice, this value may be calculated in exactly the same manner as for the compound of the formula (I), while using the above equations (2)–(5). Similarly, the ranges of the carboxylmethylation degree and molecular weight (as measured by gel filtration method) of the derivatives of formulae (X) and (XI) can also be same as those of the compound of the formula (I).

Production of the compound of the formula (X) according to the fifth aspect of this invention is conducted by preparing as a starting material the "partially-N-acetylated-carboxymethylchitosan-protected peptide" complex of the formula (II) and then treating it, as will be described below. Thus, first, an active derivative of a PEG chain is reacted with the non-N-acetylated and free 2-amino-group-containing carboxymethylglucosamine units existing in the complex of the formula (II) so as to introduce the PEG chain of anyone of the formula (VI)–(IX) as a substituent group into some of the free 2-amino groups of said units. Further, any remaining free amino groups of the carboxymethylgluocosamine units of said complex are N-acetylated. The protective groups are then removed from the moiety of the protected peptide present in the N-acetylated complex to achieve the deprotection of the latter. A reactive derivative of a drug compound is then reacted with the free terminal of the deprotected peptide moiety of the complex so that the drug compound (P) is linked to the terminal of the peptide moiety of the complex.

In the above reaction steps, the various intermediates as formed after the above N-acetylation and the final product as linked to the drug compound may generically be represented by the formula (X) shown in the above.

The active derivative of the PEG chain can be, for example, an active ester (for example, the N-hydroxysuccinimido ester) of 2-O-mono-methoxy-polyethylene glycol-3, 5-dichloro-s-triazine or methoxy-polyoxyethylene carboxylic acid.

For the production of the compound of the formula (XI) according to the fifth aspect of this invention, the "partially-N-acetylated-carboxymethylchitosan-protected peptide" complex of the formula (II) is prepared at first as a starting material similarly to the production of the compound of the formula (X). The starting material is then treated, as will be described next. Thus, periodic acid, for example, is first reacted with the non-N-acetylated and free amino-group-containing carboxymethylglucosamine units of the starting complex of formula (II) so that the pyranose rings of the glucosamine are cleaved by oxidation. The aldehyde groups as formed by the cleavage is then reduced, for example, with sodium borohydride so that the complex of formula (II) is converted into the form of a polyol. The protective groups are then removed from the protected peptide moiety of the complex to deprotect the peptide moiety of the complex. A reactive derivative of a drug compound is then reacted with the free terminals of the deprotected peptide moiety, whereby the drug compound (P) is linked to the terminals of the peptide moieties of the complex. In the above reaction steps, the various intermediate as formed after the conversion of the complex (II) into the polyol and the final product as linked to the drug compound may generically be represented by the formula (XI) above.

The substances of formulae (X) and (XI) according to the fifth aspect of the present invention have a high solubility in water, and therefore such drug-delivering carriers and their complexes linked to a drug, which have improved water solubility, are provided by the compound of formula (X) or (XI) according to the fifth aspect of this invention. According to Experiment 4 to be described hereinafter, it is revealed that the substance of formula (X), for example, is excellent in its property of residing or remaining in blood and exhibits an improved selectivity to be delivered toward the site of cancer (the organotropism) when said substance bears an anticancer agent as a drug compound or pharmaceutical compound.

The derivative of the formula (I) and the derivatives of the formulae (X) and (XI), all of which pertain to this invention, have advantageous properties, as will be described below.

As will be demonstrated by the experiments to be described hereinafter, the derivatives of the formula (I) and (X) according to this invention can remain stable in blood during the period after their administration by intravenous injection until their arrival at a target organ, and in other words, said derivatives can retain their high level required of the substances of this invention in blood. On the other hand, they can undergo gradual enzymatic degradation in vivo, so that there is no problem that the N-acetylcarboxymethylchitosan unit of this derivative would remain objectionably for a long time in the living body. Further, all the derivative of the formula (I) and the derivatives of the formulas (X) and (XI) according to this invention, can be observed to possess the tendency of organotropism.

Incidentally, that the tendency of organotropism is possessed by the compounds of the formulae (I), (X) and (XI)

according to this invention when they are administered, does neither mean anything beyond that said compounds can exhibit a tendency of increasing the concentrations of the present compounds as measured at the site of a particular target organ, in comparison with such cases when there are administered such similar compounds which are prepared not in accordance with this invention, nor it does mean that the present compounds of this invention can selectively be delivered only to the site of the particular target organ.

The present invention will hereinafter be described more specifically by the following Examples.

The first to fourth aspects of the present invention are illustrated by Examples 1–16, while the fifth aspect of the present invention is illustrated by Examples 17–23.

In each Example below, the gel filtration was conducted under the following conditions: a column of TSK-gel G4000PW$_{XL}$ was used with an eluent of 0.1M NaCl at a flow rate of 0.8 ml/min. and a column temperature of 40° C., and with an amount of the sample injected being about 75 µg.

EXAMPLE 1

5.0 Grams of carboxymethylchitin (its carboxymethylation degree was 1.0 per one sugar reside, commercially available from Funakoshi Pharmaceutical Co., Ltd.) were dissolved in 0.05M acetate buffer (having a pH 6.0, 500 ml), to which egg-white lysozyme (12.5 mg) was then added, followed by incubation at 37° C. for 2 hours for the reaction. The reaction solution obtained was added to ethanol (2 l). The resulting precipitate was collected and dried in vacuo, whereby 4.25 g of a depolymerised carboxymethylchitin were obtained. This carboxymethylchitin (3.9 g) was dissolved in 1N aq. NaOH solution (390 ml) and the resultant mixture was then heated under reflux at 100° C. for 6 hours. After the pH of the resulting reaction solution was adjusted to 8, the reaction solution was centrifuged to give a supernatant. The supernatant was added to methanol (1.9 l) and the resulting precipitate was collected. The precipitate was dried in vacuo to afford 1.91 g of partially N-acetylated carboxymethylchitosan, which may hereinafter be called simply as a "polysaccharide" and which is one example of the substances of the formula (III). The molecular weight of this polysaccharide was found to be about $1 \times 10^5$, as measured by gel filtration method (column: G4000PW$_{XL}$) while using a dextran as standard substance.

The above polysaccharide (200 mg) was dissolved in 0.5% aq. NaHCO$_3$ solution (20 ml), followed by addition of dimethylformamide (17.5 ml) into the resultant uniform solution of the polysaccharide. On the other hand, a peptide of which the terminal amino group has been protected by tert-butoxycarbonyl group (namely, Boc), and which was shown by formula N-Boc-Phe-Phe-Gly-OH, (94 mg), was dissolved in 1.5 ml of dimethylformamide, followed by addition of N-hydroxysuccinimide (23 mg) and N,N'-dicyclohexylcarbodiimide (37 mg) to the resulting solution. The protected peptide and the chemical reagents added were reacted with each other at 4° C. for 24 hours to form an active ester of the N-protected peptide. The whole reaction mixture was added to the above-mentioned polysaccharide solution, followed by reaction at 4° C. for 16 hours. The resulting reaction solution was added to ethanol (160 ml). The resulting precipitate was collected and then dried in vacuo, thereby to afford 200 mg of a complex of partially-N-acetylated-carboxymethylchitosan—Gly-Phe-Phe-Boc [as one example of the derivative of the formula (II)].

Figure 2:
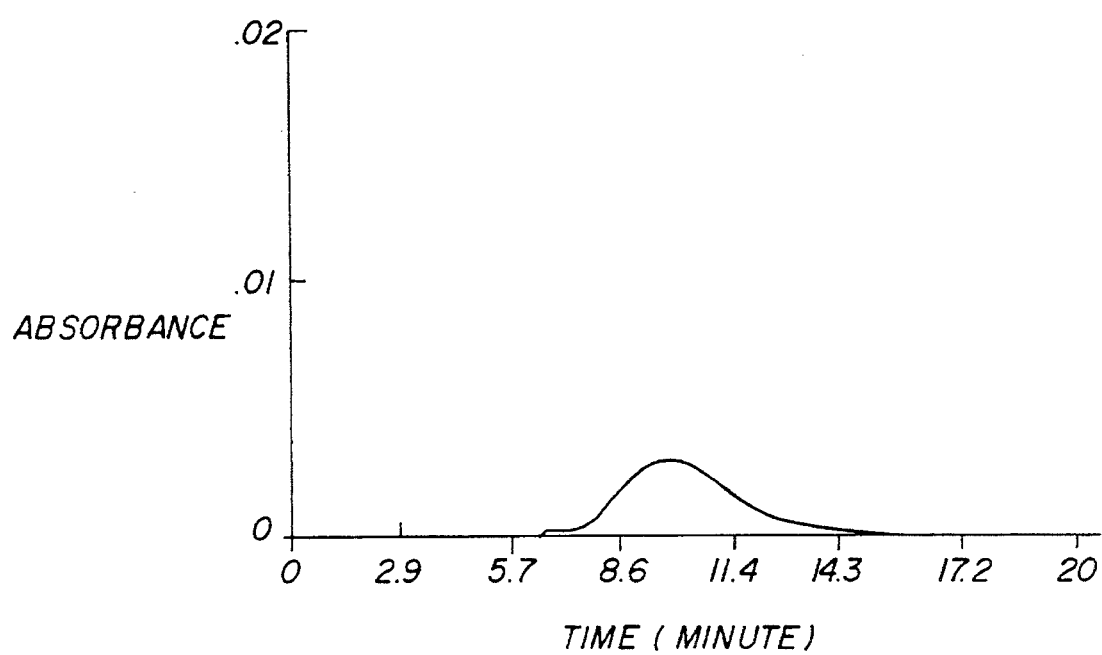
FIG. 2 shows a GFC elution pattern of the N-acetylcarboxymethylchitosan—Gly-Phe-Phe-Boc complex as obtained in Example 1 of this invention (with detection of the complex being made by ultraviolet absorption at 258 nm)

The above complex (150 mg) was dissolved in saturated aq. NaHCO$_3$ solution (15 ml), to which acetic anhydride (0.6 ml) was then added, followed by the N-acetylation of the complex being conducted at room temperature for 17 hours. The resulting reaction solution was neutralized and then poured into ethanol (80 ml). The resulting precipitate was collected and then dried in vacuo, thereby to afford 154 mg of a complex of N-acetylcarboxymethylchitosan—Gly-Phe-Phe-Boc as one example of the derivatives of the formula (I). Ultraviolet absorption spectrum and GFC (gel filtration chromatographic) elution pattern of the above complex as obtained are shown in FIG. 1 and FIG. 2 of the accompanying drawings, respectively. The content of the N-Boc-peptide in this complex was determined to be 14.1% (wt. %), by ultraviolet absorption spectrophotometry (at 258 nm).

Figure 3:
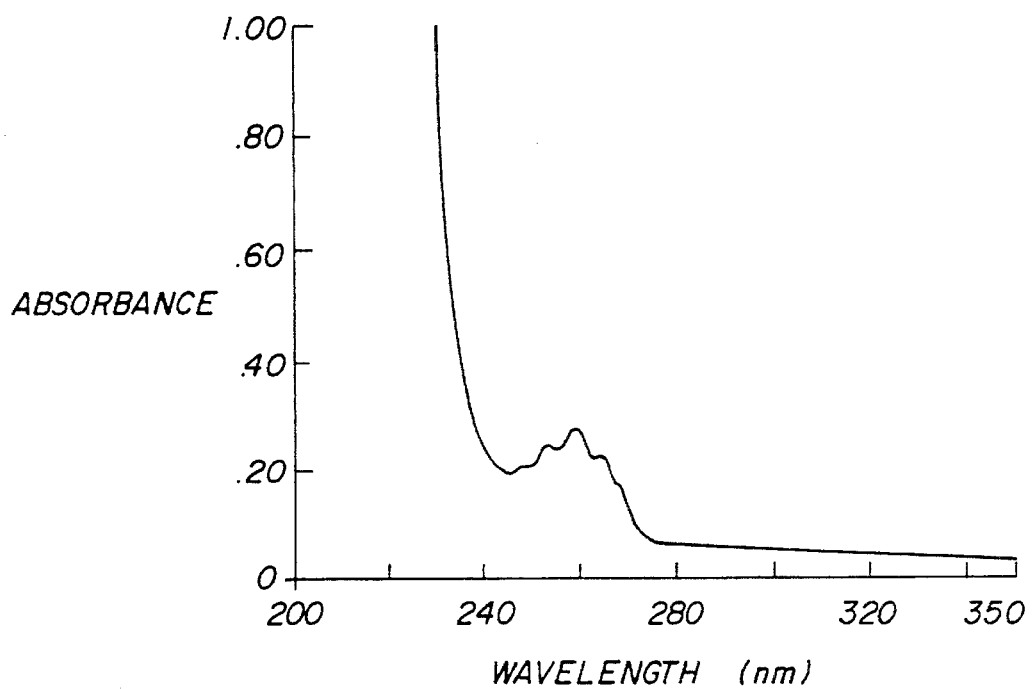
FIG. 3 shows an ultraviolet absorption spectrum of the N-acetylcarboxymethylchitosan—Gly-Phe-Phe-H complex as obtained in Example 1 of this invention (at a concentration of the complex of 1900 μg/ml in aqueous 30% ethanol as solvent)
Figure 4:
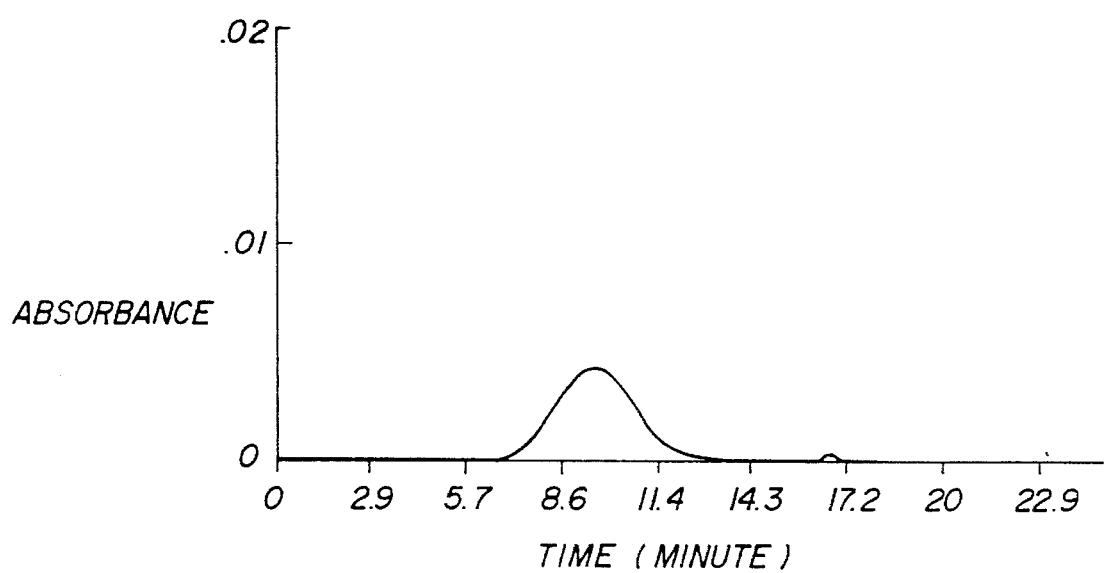
FIG. 4 shows a GFC elution pattern of the N-acetylcarboxymethylchitosan—Gly-Phe-Phe-H complex as obtained in Example 1 of this invention (with detection of the complex being made by ultraviolet absorption at 258 nm)

The above complex (130 mg) was dissolved in 0.5N HCl (13 ml) and then reacted at 30° C. for 17 hours, so that the complex was subjected to the deprotecting treatment for removal of the Boc groups from the complex. The reaction solution obtained was neutralized and then poured into ethanol (70 ml). The resulting precipitate was collected and then dried in vacuo, thereby to afford 121 mg of a complex of N-acetylcarboxymethylchitosan—Gly-Phe-Phe-H [as another example of the derivative of the formula (I)]. Ultraviolet absorption spectrum and GFC elution pattern of this complex as afforded are shown in FIG. 3 and FIG. 4 of the accompanying drawings, respectively. The content of the peptide chain in this complex was determined to be 11.3% (wt. %), by ultraviolet absorption spectrophotometry (258 nm).

Figure 5:
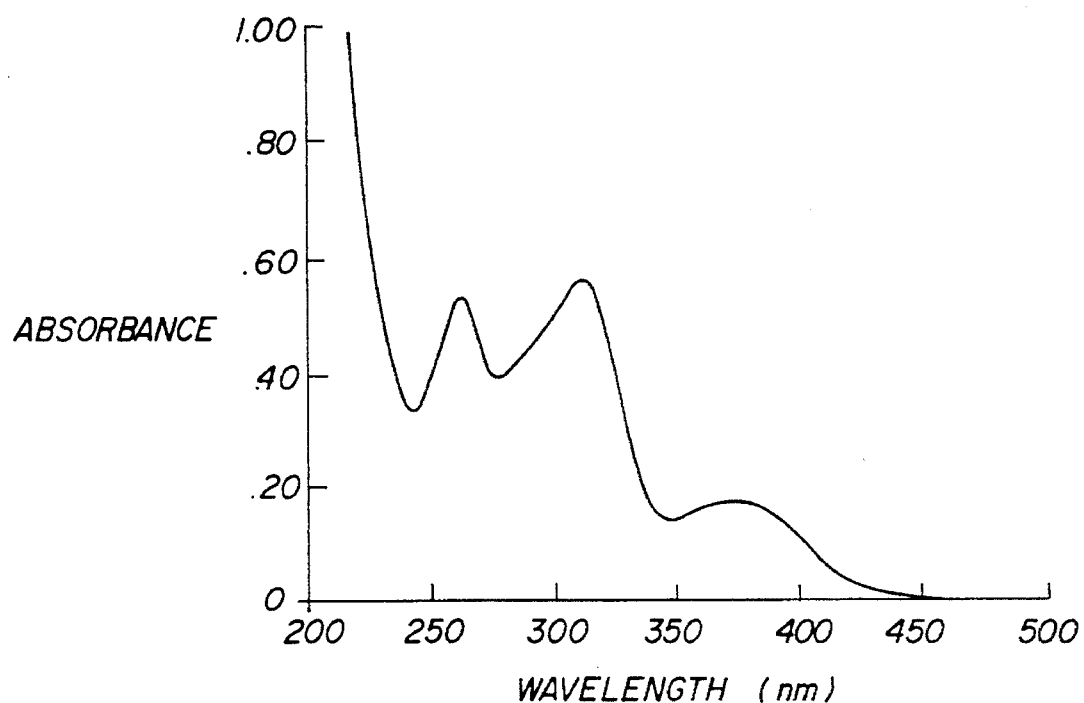
FIG. 5 shows an ultraviolet-visible absorption spectrum of the N-acetylcarboxymethylchitosan—Gly-Phe-Phe-MTX complex obtained as the final product in Example 1 of this invention (at a concentration of the complex of 100 μg/ml in aqueous 0.1% $NaHCO_3$ as solvent)
Figure 6:
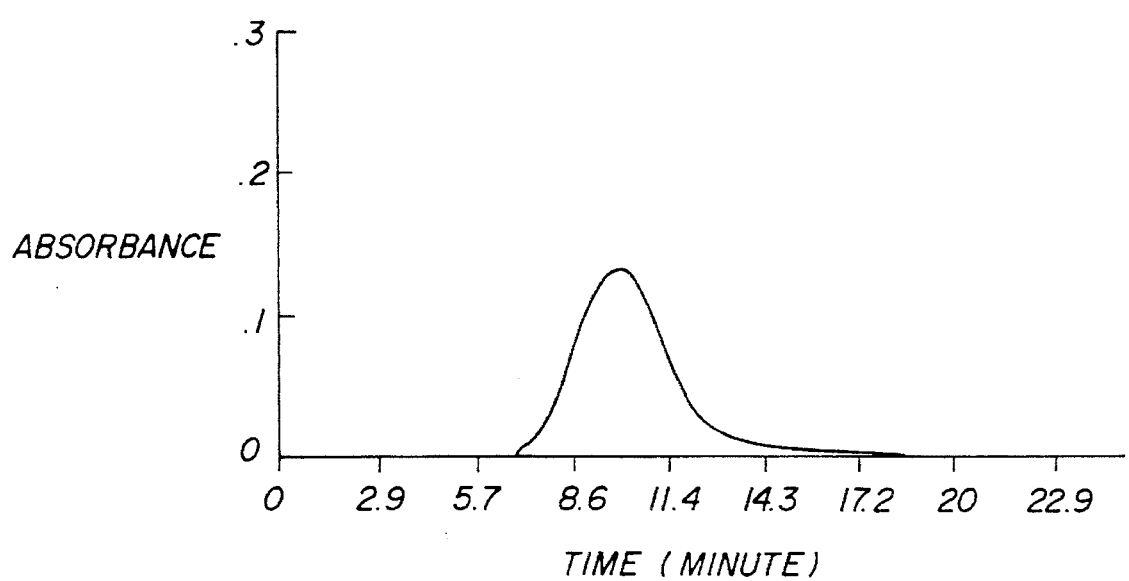
FIG. 6 depicts a GFC elution pattern of the N-acetylcarboxymethylchitosan—Gly-Phe-Phe-MTX complex obtained as the final product in Example 1 of this invention (with detection of the complex being made by ultraviolet absorption at 307 nm)

Methotrexate (MTX) (182 mg) as a pharmaceutical or drug compound having the carboxyl group was dissolved in dimethylformamide (4 ml), to which N,N'-dicyclohexylcarbodiimide (82 mg) was then added, followed by reaction at 4° C. for 17 hours. N-Hydroxysuccinimide (46 mg) and pyridine (63 µl) were added to the resulting reaction solution, and the reaction mixture so formed was then subjected to the reaction at room temperature for 5 hours so that an active ester of MTX was prepared in the resulting reaction solution. On the other hand, the above complex of N-acetylcarboxymethylchitosan—Gly-Phe-Phe-H, (50 mg) was dissolved in 0.5% aq. NaHCO$_3$ solution (10 ml), followed by addition thereto of 0.5 ml of the above-mentioned reaction solution which contained the active ester of MTX. They were reacted with each other at 4° C. for 15 hours, whereby MTX was linked to N-terminals of the peptide chain -Gly-Phe-Phe-H of the complex. Then, the reaction solution so obtained was poured into ethanol (40 ml). The resulting precipitate was collected and then dried in vacuo, to obtain 53 mg of a complex of N-acetylcarboxymethylchitosan—Gly-Phe-Phe—MTX [as a further example of the complex of the formula (I)] as yellow powder. Ultraviolet-visible absorption spectrum and GFC elution pattern of this complex are shown in FIG. 5 and FIG. 6 of the accompanying drawings, respectively. The content of MTX in this complex was determined to be 11.5% (wt. %), by ultraviolet absorption spectrophotometry (at 307 nm). Further, the P/X molar ratio of this complex, more specifically, the ratio of MTX/peptide (molar ratio) in this complex was 0.93 as calculated in accordance with the calculation equation (5) described hereinbefore.

With respect to this complex, the value of a/(a+b) as defined for the formula (I) was approximately 0.09 as calculated in accordance with the calculation equation (1) given before.

EXAMPLE 2

The partially N-acetylated carboxymethylchitosan (100 mg) obtained in Example 1 above was dissolved in 1% aq. NaHCO$_3$ solution (10 ml), followed by addition of dimethylformamide (6 ml) into the resulting uniform polysaccharide solution. A peptide of which terminal amino group was protected by p-methoxybenzyloxycarbonyl group (pMZ), and which was shown by a formula pMZ-Gly-Gly-Gly-OH, (141 mg), was dissolved in 4 ml of dimethylformamide, to which N-hydroxysuccinimide (46 mg) and N,N'-dicyclohexylcarbodiimide (74 mg) were then added. They were reacted at room temperature for 3 hours to form an active ester of the N-protected peptide. The whole reaction solution containing the above active ester was added to the above-mentioned polysaccharide solution, to which dimethylformamide (10 ml) was then added. The whole mixture was subjected to reaction at 4° C. for 23 hours. Water (5 ml) was added to the resulting reaction solution, followed by centrifugation to obtain a supernatant. The supernatant was added to ethanol (150 ml) and the resulting precipitate was collected. The precipitate was then dried in vacuo, thereby to afford 120 mg of a complex of partially-N-acetylated-carboxymethylchitosan—Gly-Gly-Gly-pMZ [as one example of the derivatives of the formula (II)].

Figure 7:
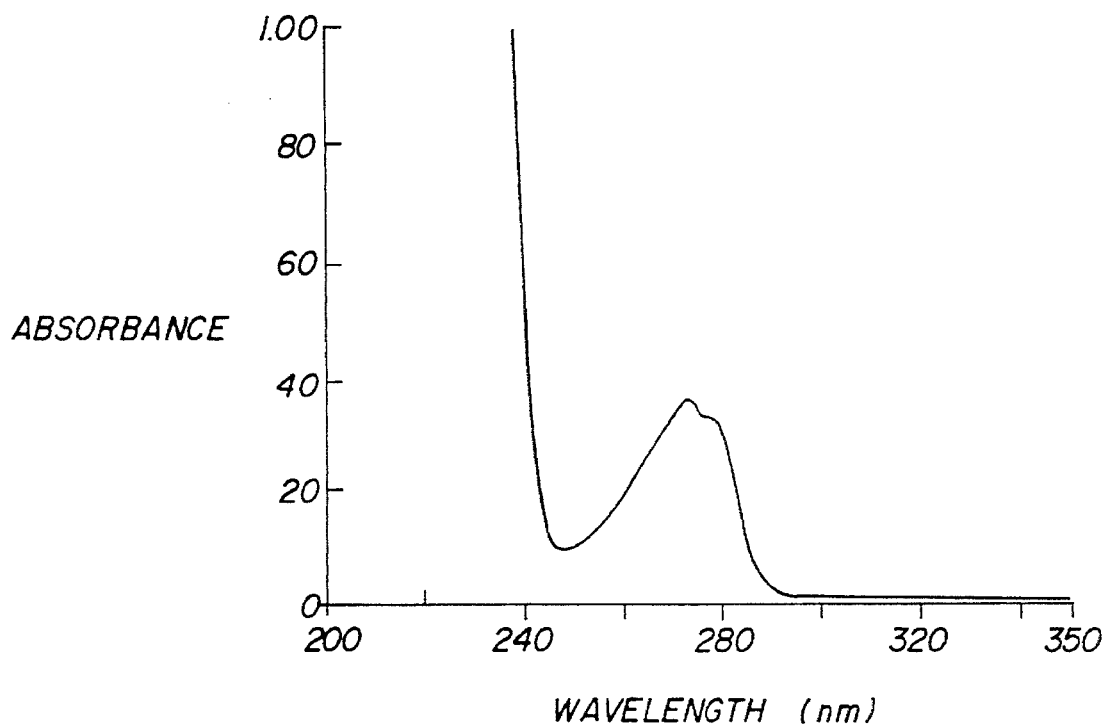
FIG. 7 shows an ultraviolet absorption spectrum of the N-acetylcarboxymethylchitosan—Gly-Gly-Gly-pMZ complex as obtained in Example 2 of this invention (at a concentration of the complex of 500 μg/ml in water as solvent)
Figure 8:
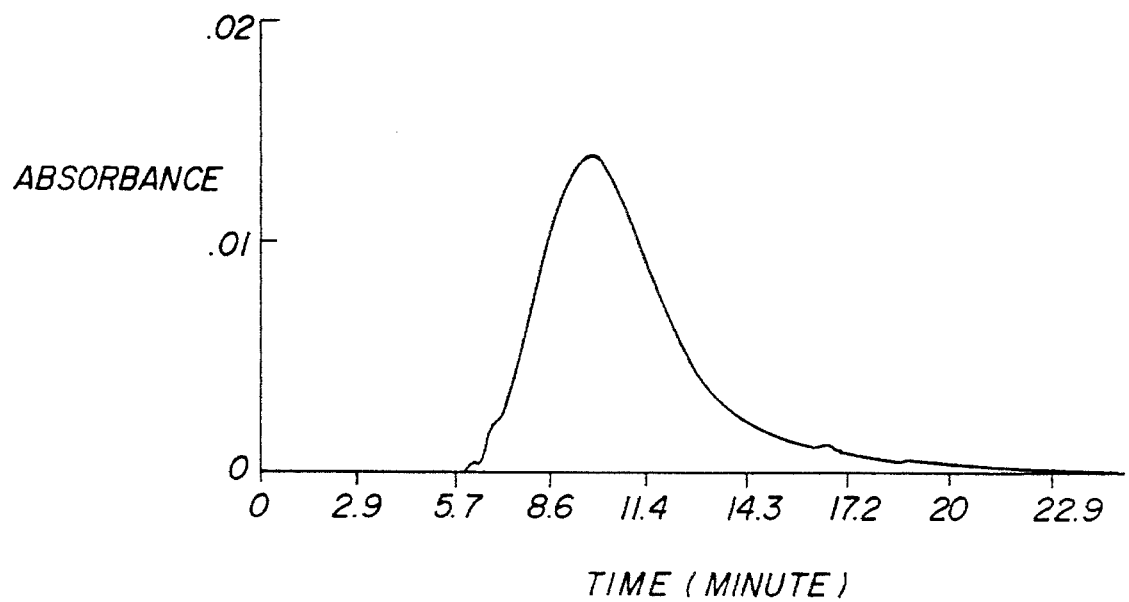
FIG. 8 depicts a GFC elution pattern of the N-acetylcarboxymethylchitosan—Gly-Gly-Gly-pMZ complex as obtained in Example 2 of this invention (with detection of the complex being made by ultraviolet absorption at 272 nm)

In a similar manner to Example 1, this complex (100 mg) was N-acetylated with acetic anhydride, whereby a complex of N-acetylcarboxymethylchitosan—Gly-Gly-Gly-pMZ, (97 mg) was obtained. Ultraviolet absorption spectrum and GFC elution pattern of the resulting complex as acetylated are shown in FIG. 7 and FIG. 8, respectively. The content of the pMZ-peptide in this complex was determined to be 20.1% (wt. %) by ultraviolet absorption spectrophotometry (at 272 nm).

Figure 9:
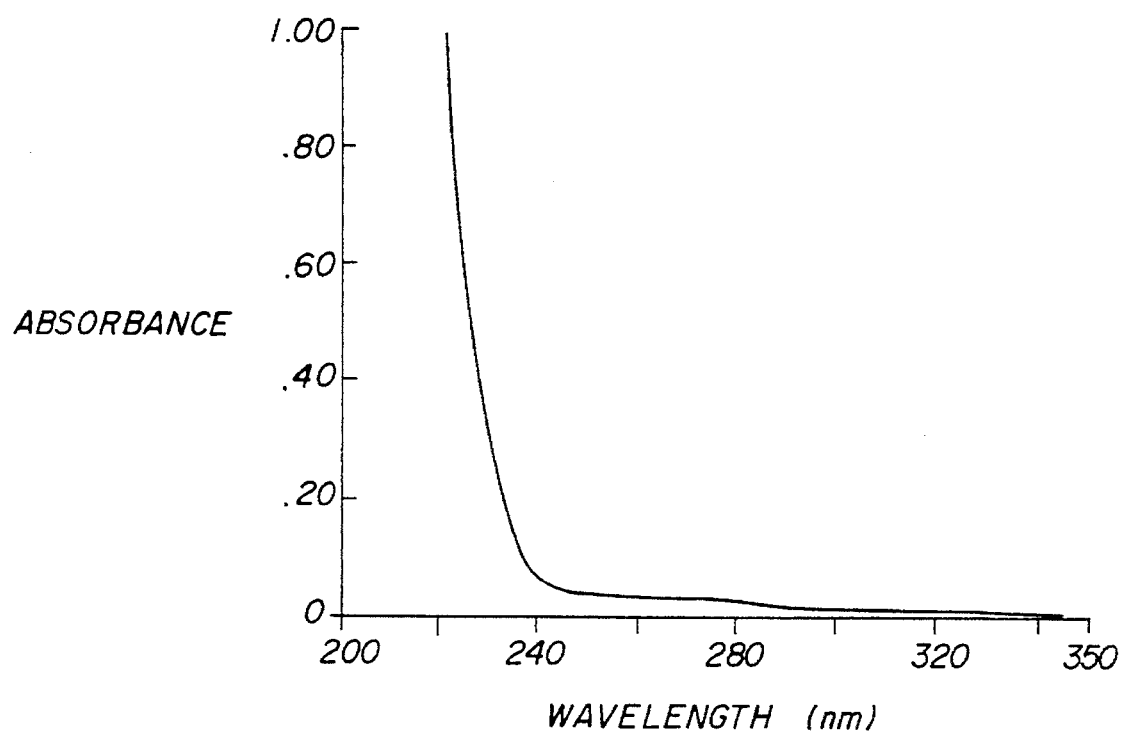
FIG. 9 shows an ultraviolet absorption spectrum of the N-acetylcarboxymethylchitosan—Gly-Gly-Gly-H complex as obtained in Example 2 of this invention (at a concentration of the complex of 1000 μg/ml in water as solvent)

In a similar manner to Example 1, this complex (89 mg) was subjected to acid treatment to remove pMZ, the protective groups, whereby 78 mg of a complex of N-acetylcarboxymethylchitosan—Gly-Gly-Gly-H were obtained. Ultraviolet absorption spectrum of this complex are shown in FIG. 9. The content of the peptide chain in this complex was 11.3% (wt. %) as determined in accordance with the calculation equation (3) given hereinbefore.

Figure 10:
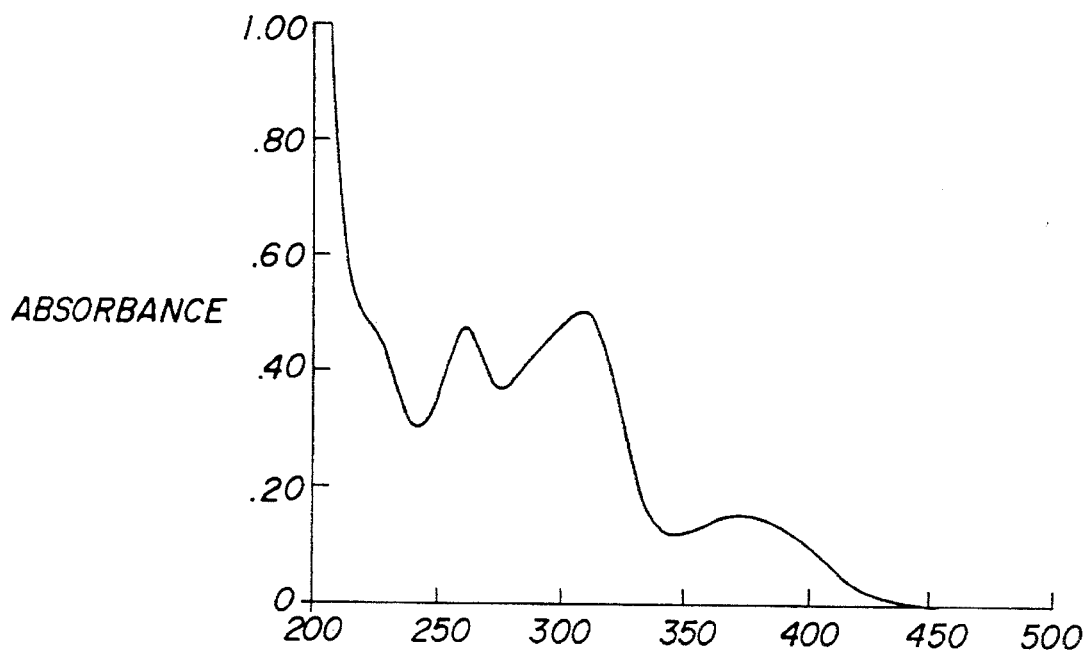
FIG. 10 shows an ultraviolet-visible absorption spectrum of the N-acetylcarboxymethylchitosan—Gly-Gly-Gly-MTX complex obtained as the final product in Example 2 of this invention (at a concentration of the complex of 48 μg/ml in aqueous 0.1% $NaHCO_3$ as solvent)
Figure 11:
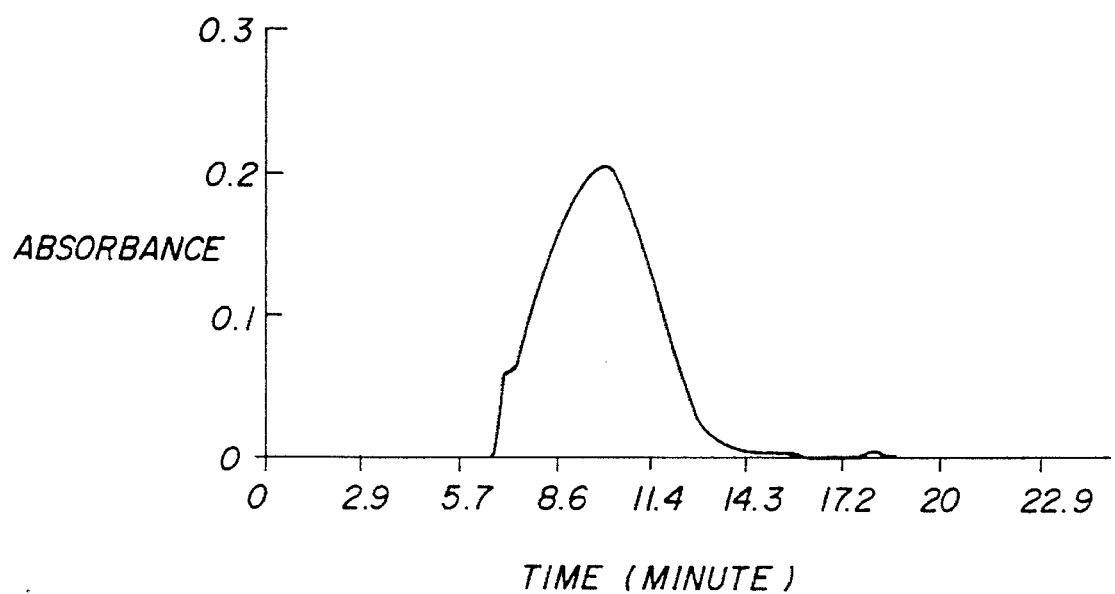
FIG. 11 depicts a GFC elution pattern of the N-acetylcarboxymethylchitosan—Gly-Gly-Gly-MTX complex obtained as the final product in Example 2 of this invention (with detection of the complex being made by ultraviolet absorption at 307 nm)

50 mg of this complex were dissolved in 1% aq. NaHCO$_3$ solution (5 ml), to which a solution (1 ml) of the active ester of MTX was then added, followed by the reaction at 4° C. for 21 hours. The resulting reaction solution was poured into ethanol (25 ml). The resulting precipitate was collected and then dried in vacuo, to afford 52 mg of a complex of N-acetylcarboxymethylchiotosan—Gly-Gly-Gly—MTX [as a further example of the complex of the formula (I)] as yellow powder. Ultraviolet-visible absorption spectrum and GFC elution pattern of this complex are shown in FIG. 10 and FIG. 11, respectively. The content of MTX in this complex was determined to be 21.4% (wt. %) by ultraviolet absorption spectrophotometry (at 307 nm). Further, the P/X molar ratio of this complex, more specifically, the ratio of MTX/peptide (molar ratio) in said complex was 1.0 as calculated in accordance with the calculation equation (5) described hereinbefore. With respect to said complex, its value of a/(a+b) as defined for the formula (I) was 0.2 as calculated in accordance with the calculation equation (1) given hereinbefore.

EXAMPLE 3

Egg white lysozyme was reacted with 5.0 g of a carboxymethylchitin (its carboxymethylation degree was 1.0 per one sugar residue) in a similar manner to Example 1 to prepare a depolymerised carboxymethylchitin (4.28 g). A 4.1 g portion of this depolymerised carboxymethylchitin was subjected to alkali treatment, whereby a partially N-acetylated carboxymethylchitosan (2.22 g) having a molecular weight of about $1 \times 10^5$ was obtained.

An active ester of an N-protected peptide of formula N-Boc-Gly-Phe-Gly-Gly-OH (90 mg) was reacted with the partially N-acetylated carboxymethylchitosan (200 mg) as obtained above in a similar manner to Example 1 to produce a complex of partially-N-acetylated-carboxymethylchitosan—Gly-Gly-Phe-Gly-Boc, (210 mg). A 200 mg portion of this complex was thereafter N-acetylated to prepare a complex of N-acetylcarboxymethylchitosan—Gly-Gly-Phe-Gly-Boc, (190 mg). The content of the N-Boc-peptide chain in this complex was determined to be 9.8 wt. % (wt. %) by ultraviolet absorption spectrophotometry (at 258 nm).

A 160 mg portion of this complex was deprotected by acid treatment in a similar manner to Example 1 to obtain a complex of N-acetylcarboxymethylchitosan—Gly-Gly-Phe-Gly-H, (144 mg, with a peptide content of 7.6%).

An active ester of MTX (55 mg) was reacted with a 120 mg portion of the latter complex, whereby a complex of N-acetylcarboxymethylchitosan—Gly-Gly-Phe-Gly—MTX (127 mg, with an MTX content of 9.5%) was produced. With respect to this complex, the ratio of MTX/peptide (molar ratio) in said complex and its value of a/(a+b) defined for the formula (I) were 1.0 and 0.07, respectively, as calculated in accordance with the aforesaid calculation equations (5) and (1).

EXAMPLE 4

In a similar manner to Example 1, an active ester of an N-protected peptide,N-Boc-Gly-Phe-Gly-Phe-OH, (105 mg) was reacted with the partially N-acetylated carboxymethylchitosan (200 mg) which was obtained in Example 3 above. Thereby, a complex of partially-N-acetylated-carboxymethylchitosan—Phe-Gly-Phe-Gly-Boc, (199 mg) was produced.

A 188 mg portion of this complex was N-acetylated so that a complex of N-acetylcarboxymethylchitosan—Phe-Gly-Phe-Gly-Boc, (191 mg) was prepared. The content of the N-Boc-peptide chain in this complex was determined to be 4.9% (wt. %) by ultraviolet absorption spectrophotometry (at 258 nm). A 160 mg portion of this complex was deprotected by acid treatment in a similar manner to Example 1 to afford a complex of N-acetylcarboxymethylchitosan—Phe-Gly-Phe-Gly-H, (150 mg, with a peptide content of 4.0%). An active ester of MTX (23 mg) was thereafter reacted with a 50 mg portion of the latter complex, whereby a complex of N-acetylcarboxymethylchitosan—Phe-Gly-Phe-Gly—MTX (46 mg, with an MTX content of 4.5 wt. %) was prepared. With respect to this complex, the MTX/peptide molar ratio in this complex and its value of a/(a+b) defined for the formula (I) were 1.1 and 0.03, respectively, as calculated from the aforesaid calculation equations (5) and (1).

EXAMPLE 5

In a similar manner to Example 1, an active ester of an N-protected peptide, N-Boc-Phe-Gly-Phe-Gly-OH, (54 mg) was reacted with the partially N-acetylated carboxymethylchitosan (100 mg) as obtained in Example 3. Thus, a complex of partially-N-acetylated-carboxymethylchitosan-Gly-Phe-Gly-Phe-Boc, (109 mg) was prepared.

A 90 mg portion of this complex was N-acetylated, affording a complex of N-acetylcarboxymethylchitosan—Gly-Phe-Gly-Phe-Boc, (85 mg). The content of the N-Boc-peptide chain in this complex was determined to be 12.7% (wt. %) by ultraviolet absorption spectrophotometry (at 258 nm). A 72 mg portion of this complex was deprotected by acid treatment in a similar manner to Example 1 to prepare a complex of N-acetylcarboxymethylchitosan—Gly-Phe-Gly-Phe-H, (63 mg, with a peptide content of 10.4%).

An active ester of MTX (23 mg) was thereafter reacted with a 50 mg portion of the latter complex, whereby a complex of N-acetylcarboxymethylchitosan—Gly-Phe-Gly-Phe—MTX (49 mg, with an MTX content of 9.4%) was produced. With respect to this complex, the ratio of MTX/peptide (molar ratio) in said complex and its value a/(a+b) defined for the formula (I) were 0.94 and 0.07, respectively, as calculated in accordance with the aforesaid equations (5) and (1).

EXAMPLE 6

In a similar manner to Example 1, an active ester of an N-protected peptide, N-Boc-Ala-Gly-Gly-Gly-OH, (180 mg) was reacted with the partially N-acetylated carboxymethylchitosan (200 mg) as obtained in Example 3, whereby a complex of partially-N-acetylated-carboxymethylchitosan—Gly-Gly-Gly-Ala-Boc, (218 mg) was prepared. A 150 mg portion of this complex was N-acetylated, affording a complex of N-acetylcarboxymethyl chitosan—Gly-Gly-Gly-Ala-Boc, (143 mg). A 130 mg portion of the latter complex was subjected to acid treatment for the deprotection in a similar manner to Example 1 to produce a complex of N-acetylcarboxymethylchitosan—Gly-Gly-Gly-Ala-H, (120 mg).

Figure 12:
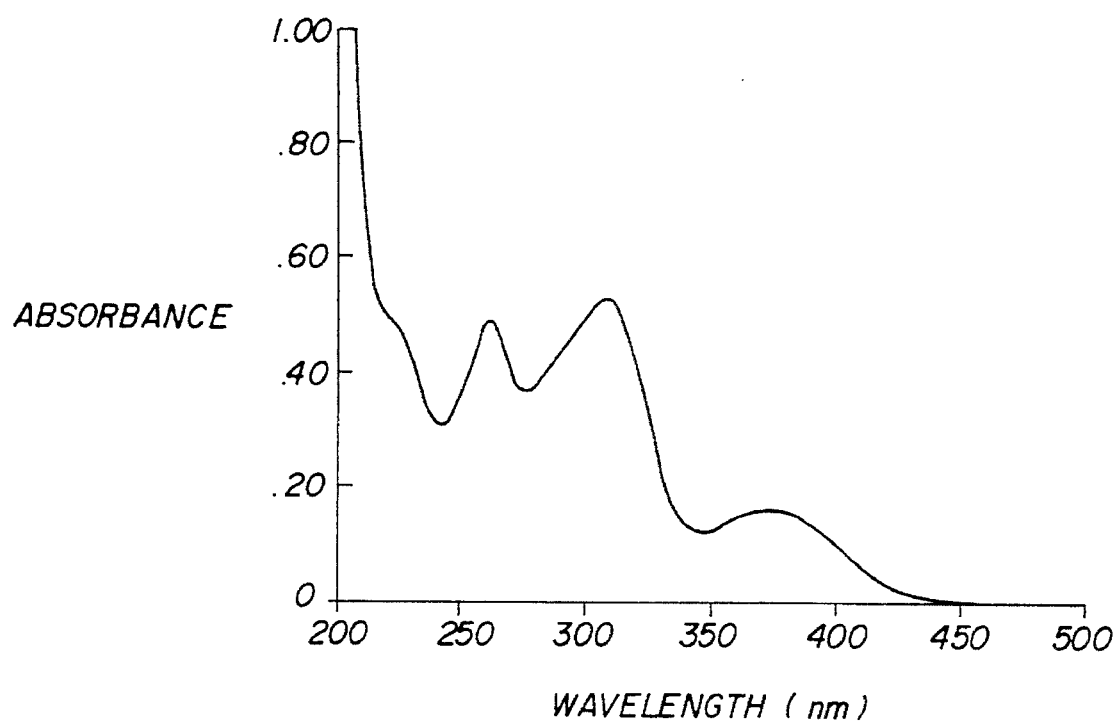
FIG. 12 shows an ultraviolet-visible absorption spectrum of the N-acetylcarboxymethylchitosan—Gly-Gly-Gly-Ala-MTX complex as obtained in Example 6 of this invention (at a concentration of the complex of 50 μg/ml in aqueous 0.1% $NaHCO_3$ as solvent)
Figure 13:
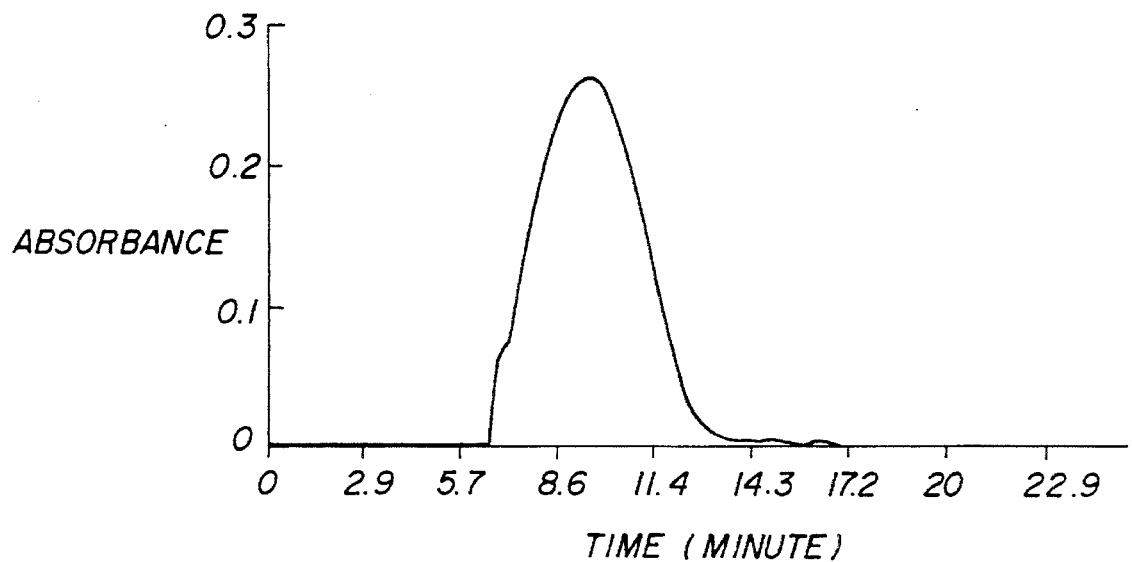
FIG. 13 depicts a GFC elution pattern of the N-acetylcarboxymethylchitosan—Gly-Gly-Gly-Ala-MTX complex as obtained in Example 6 of this invention (with detection of the complex being made by ultraviolet absorption at 307 nm)

The active ester of MTX (46 mg) was thereafter reacted with a 50 mg portion of the last-mentioned complex, whereby a complex of N-acetylcarboxymethylchitosan—Gly-Gly-Gly-Ala—MTX (55 mg, with an MTX content of 21.5%) was obtained. Ultraviolet-visible absorption spectrum and GFC elution pattern of the latter complex are shown in FIG. 12 and FIG. 13 of the accompanying drawings, respectively.

EXAMPLE 7

Partially N-acetylated carboxymethylchitosan (45 mg), which had been prepared from carboxymethylchitin (its carboxymethylation degree was 0.7 per sugar residue) in a similar manner to Example 1 and had a molecular weight of about $1 \times 10^5$ was dissolved in a 0 1M borate buffered solution (pH 8.0, 2 ml) to prepare a solution of the polysaccharide. On the other hand, a modified peptide of a formula N-succinyl-Ala-Ala-Ala-p-nitroanilide, (45 mg) was dissolved in dimethylformamide (2 ml), to which were then added N-hydroxysuccinimide (12 mg) and N,N'-dicyclohexylcarbodiimide (41 mg). The reaction was made at room temperature for 1 hour and then at 4° C. for 18 hours, so that an active ester of said peptide having the nitroanilide bonded thereto was prepared. The resulting reaction solution was distilled under reduced pressure to remove the solvent therefrom. The residue was washed with isopropanol and then dissolved in dimethylformamide (0.8 ml). The solution obtained was added to the above-mentioned polysaccharide solution, followed by reaction at room temperature for 40 hours. Ethanol was added to the resulting reaction solution. The precipitate as formed was collected and then dried in vacuo, whereby 46 mg of a complex of partially-N-acetylated-carboxymethylchitosan—Suc-Ala-Ala-Ala—p-nitroanilide were obtained.

Figure 14:
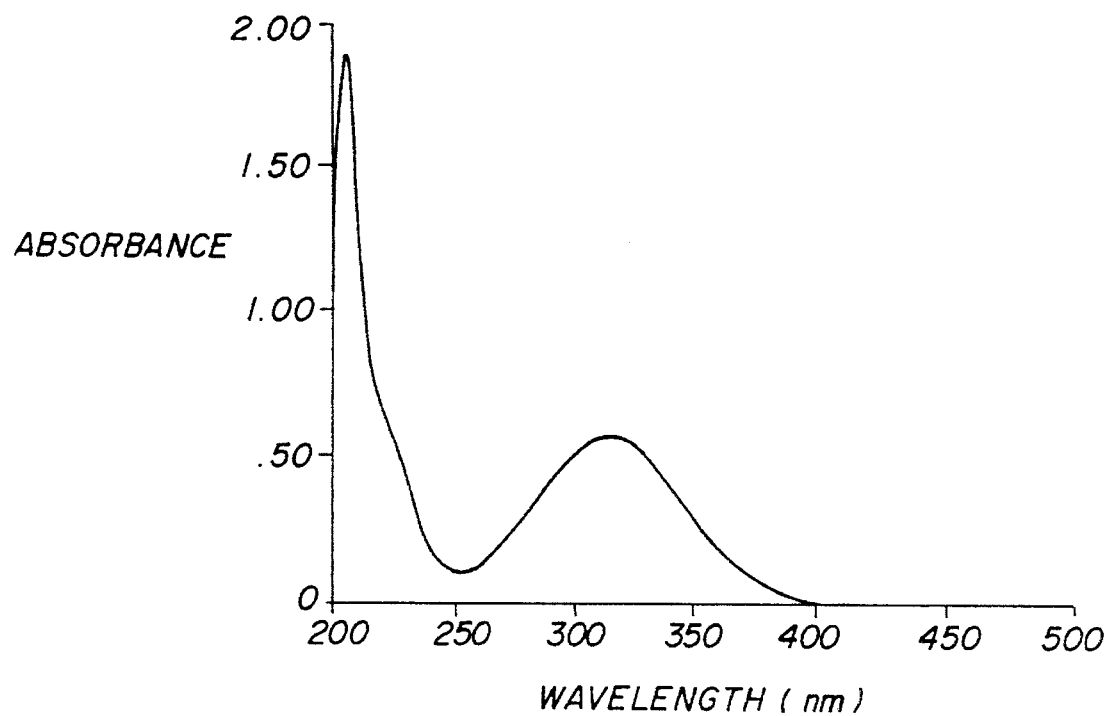
FIG. 14 shows an ultraviolet absorption spectrum of the N-acetylcarboxymethylchitosan—Suc-Ala-Ala-Ala-p-nitroanilide complex obtained as the final product in Example 7 of this invention (at a concentration of the complex of 500 μg/ml in water as solvent)
Figure 15:
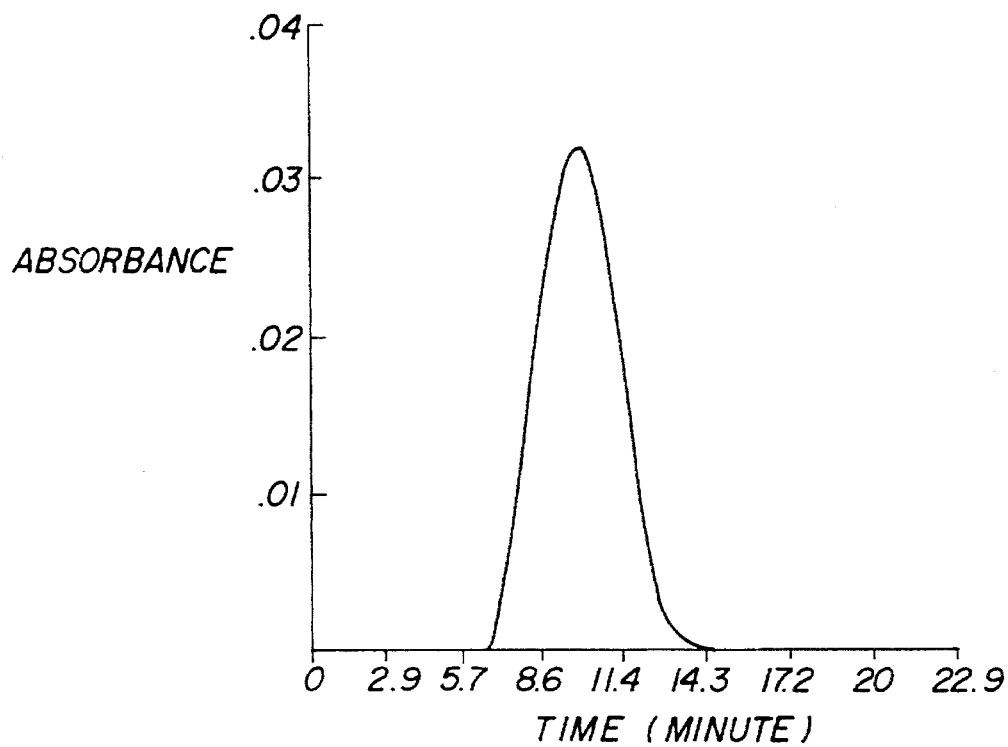
FIG. 15 depicts a GFC elution pattern of the N-acetylcarboxymethylchitosan—Suc-Ala-Ala-Ala-p-nitroanilide complex obtained as the final product in Example 7 of this invention (with detection of the complex being made by ultraviolet absorption at 315 nm)

26 mg of this complex was taken and dissolved in saturated aq. NaHCO$_3$ solution (3 ml), to which acetic anhydride (0.14 ml) was then added, followed by the reaction at 4° C. for 24 hours to N-acetylate the complex. After the reaction solution obtained was dialyzed against water, the resulting non-dialysable solution left after dialysis was poured into ethanol. The resulting precipitate was dried in vacuo so that a complex of N-acetylcarboxymethylchitosan—Suc-Ala-Ala-Ala—p-nitroanilide (25 mg) was obtained. Ultraviolet absorption spectrum and GFC elution pattern of this complex are shown in FIG. 14 and FIG. 15 of the accompanying drawings, respectively. The content of the moiety Suc-Ala-Ala-Ala—p-nitroanilide in this complex was found to be 3.9% (wt. %) from its absorption spectrophotometry at 315 nm.

EXAMPLE 8

An active ester of a modified peptide of formula N-succinyl-Ala-Ala-Val-Ala—p-nitroanilide, (55 mg) was reacted with the partially N-acetylated carboxymethylchitosan (45 mg) in a similar manner to Example 7 to prepare a complex of partially-N-acetylated-carboxymethylchitosan—Suc-Ala-Ala-Val-Ala—p-nitroanilide (44 mg).

30 mg of this complex was thereafter N-acetylated in a similar manner to Example 7, to give a complex of N-acetylcarboxymethylchitosan—Suc-Ala-Ala-Val-Ala—p-nitroanilide (22 mg). The content of the moiety Suc-Ala-Ala-Val-Ala—p-nitroanilide in the latter complex was found to be 4.5% (wt. %) from its absorption spectrophotometry at 315 nm.

EXAMPLE 9

The partially N-acetylated carboxymethylchitosan (50 mg) as obtained in Example 1 was dissolved in 0.25% aq. NaHCO$_3$ solution (7 ml), and into the resulting uniform solution of the polysaccharide was added dimethylformamide (6 ml). On the other hand, a phenylalanine having been protected by a protective group Boc and shown by a formula N-Boc-Phe-OH (256 mg) was dissolved in 3 ml of dimethylformamide, followed by addition of N-hydroxysuccinimide (115 mg) and N,N'-dicyclohexylcarbodiimide (190 mg) to the resultant solution. The reaction was made at 4° C. for 20 hours to prepare an active ester of the N-protected phenylalanine. A 1 ml portion of the resultant reaction solution which contained said active ester was added to the above-mentioned polysaccharide solution, followed by the reaction at room temperature for 20 hours. The reaction solution obtained was added to ethanol (35 ml). The resulting precipitate was collected and then dried in vacuo, whereby 51 mg of a complex of partially-N-acetylated-carboxymethylchitosan—Phe-Boc were obtained. The content of the N-Boc-phenylalanine (Phe-Boc) in this complex was determined to be 14.4% (wt. %) from ultraviolet absorption spectrophotometry (at 258 nm).

EXAMPLE 10

The depolymerized carboxymethylchitin (4.1 g) as prepared in a similar manner to Example 3 was partially de-N-acetylated by alkali treatment and the resulting reaction solution was adjusted to pH 8.5. The reaction solution was then centrifuged and the supernatant was added to 4.4-fold volumes of methanol. The resulting mixture was separated into the supernatant and precipitate. Ethanol (300 ml) was added to the supernatant. The resulting precipitate was collected and then dried in vacuo so that 0.54 g of partially-N-acetylated-carboxymethylchitosan having a molecular weight of about $2 \times 10^4$ was obtained.

This chitosan substance (100 mg) was reacted with an

N-protected peptide of formula N-Boc-Phe-Gly-Phe-Gly-OH, (217 mg) in a similar manner to Example 1, followed by the N-acetylation with acetic anhydride, whereby a complex of N-acetylcarboxymethylchitosan—Gly-Phe-Gly-Phe-Boc, (98 mg, with the content of the N-Boc-peptide of 28%) was prepared. This complex (80 mg) was deprotected by acid treatment for removal of the Boc groups in a similar manner to Example 1, to afford a complex of N-acetylcarboxymethylchitosan—Gly-Phe-Gly-Phe-H, (46 mg, with a peptide content of 24%).

The active ester of methotrexate (MTX, 69 mg) was reacted with 35 mg of the above complex in a similar manner to Example 1, so that a complex of N-acetylcarboxymethylchitosan—Gly-Phe-Gly-Phe—MTX (35 mg, with an MTX content of 19%) was obtained. With respect to this complex, the MTX/peptide molar ratio in the complex and the value a/(a+b) defined for the formula (I) were 0.92 and 0.19, respectively, as calculated in accordance with the aforesaid equations (5) and (1).

EXAMPLE 11

The partially N-acetylated carboxymethylchitosan (50 mg), which had been prepared in a similar manner to Example 10 and have a molecular weight of about $2 \times 10^4$, was dissolved in a mixed solvent of water (1.25 ml) and dimethylsulfoxide (1.25 ml). In a similar manner to Example 1, an active ester of a protected peptide of formula N-succinyl-Gly-Phe-Gly-Lys($\epsilon$-N-Boc)-O-tBu (169 mg) was reacted with the chitosan substance, whereby a complex of partially-N-acetylated-carboxymethylchitosan—Suc-Gly-Phe-Gly-Lys($\epsilon$-N-Boc)-O-tBu was prepared. This complex was N-acetylated and then, deprotected by acid treatment to produce a complex of N-acetylcarboxymethylchitosan—Suc-Gly-Phe-Gly-Lys-H, (47 mg).

Figure 20:
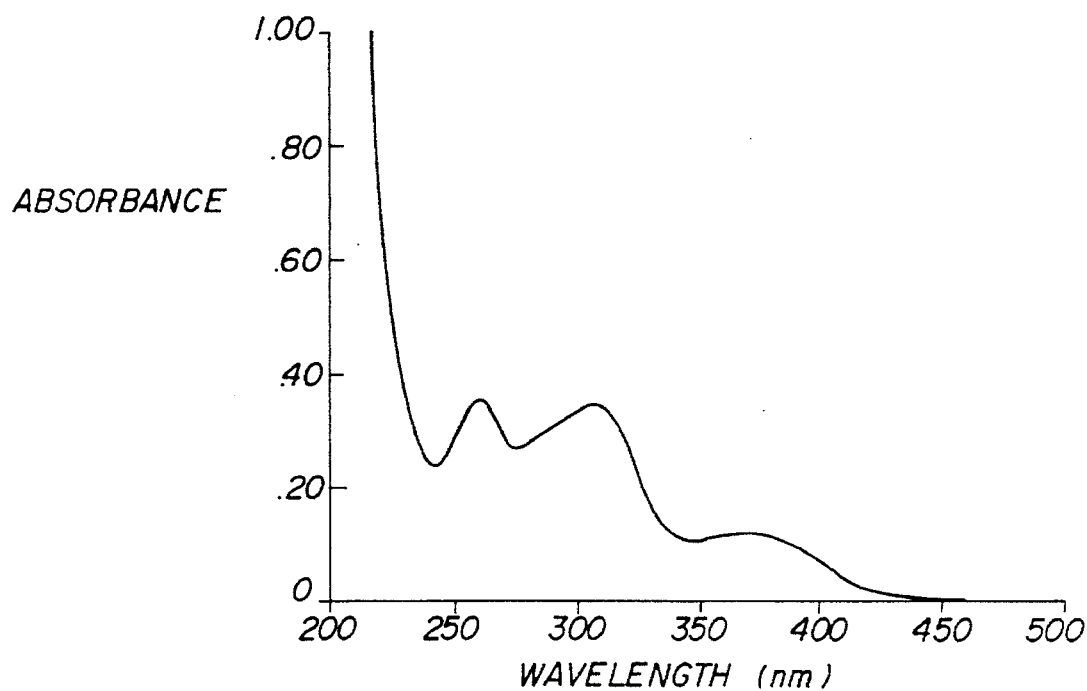
FIG. 20 shows an ultraviolet-visible absorption spectrum of the N-acetylcarboxymethylchitosan—Suc-Gly-Phe-Gly-Lys-MTX complex as obtained in Example 11 of this invention (at a concentration of the complex of 490 µg/ml in aqueous 0.1% $NaHCO_3$ as solvent)
Figure 21:
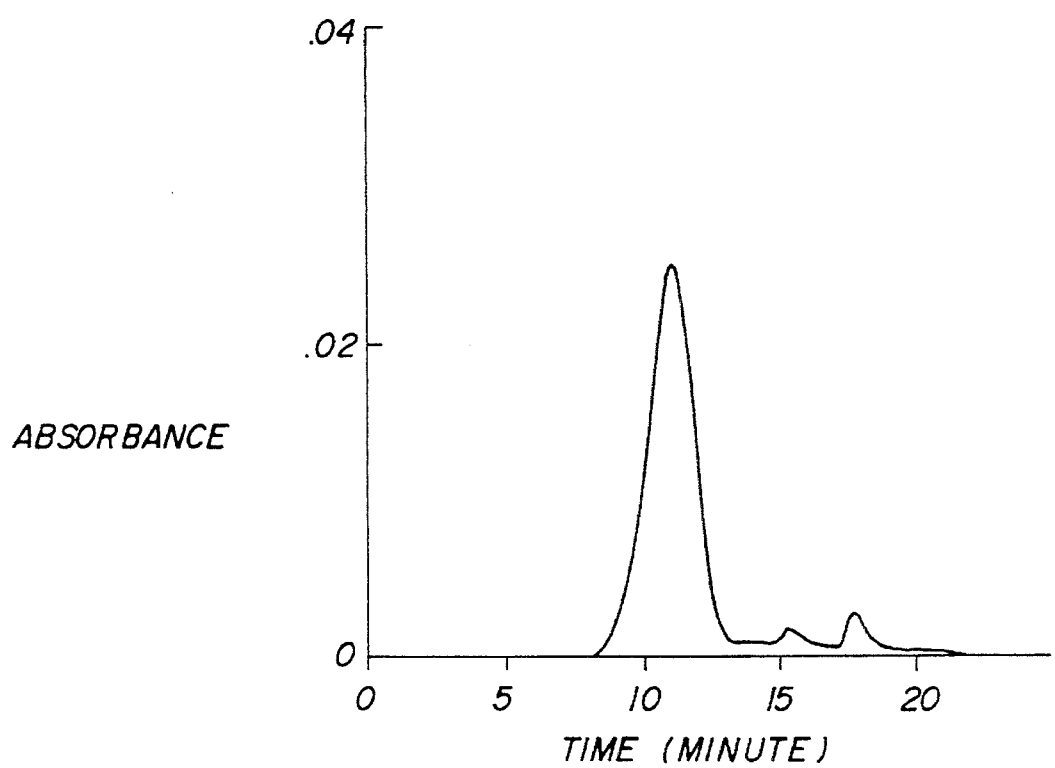
FIG. 21 depicts a GFC elution pattern of the N-acetylcarboxymethylchitosan—Suc-Gly-Phe-Gly-Lys-MTX complex as obtained in Example 11 of this invention (with detection of the complex being made by ultraviolet absorption at 307 nm)

The active ester of methotrexate (MTX) (23 mg) was reacted with 35 mg of the above complex, whereby a complex of N-acetylcarboxymethylchitosan—Suc-Gly-Phe-Gly-Lys—MTX (29 mg, with an MTX content of 1.5 wt. %) was obtained. Ultraviolet-visible absorption spectrum and GFC elution pattern of this complex are shown in FIG. 20 and FIG. 21 of the accompanying drawings, respectively.

EXAMPLE 12

In a manner similar to Example 1, 25 mg of egg white lysozyme were reacted with 5.0 g of carboxymethylchitin (its carboxymethylation degree was 0.7 per sugar residue) so that a depolymerized carboxymethylchitin (4.37 g) was obtained. 3.7 g portion of this chitin substance was partially de-acetylated by alkali treatment, to give a partially N-acetylated carboxymethylchitosan (2.58 g) having a molecular weight of about $1 \times 10^5$ (as measured using dextran as a standard substance).

The active ester (N-hydroxysuccinimido ester) of an N-protected peptide of formula N-Boc-Phe-Phe-Gly-OH, (141 mg) was reacted with the above-mentioned partially N-acetylated carboxymethylchitosan (300 mg) in a similar manner to Example 1 to produce a complex of partially-N-acetylated-carboxymethylchitosan—Gly-Phe-Phe-Boc, (340 mg). 300 mg of this complex was N-acetylated with acetic anhydride so that a complex of N-acetylcarboxymethylchitosan—Gly-Phe-Phe-Boc (298 mg, with a content of the N-Boc-peptide of 12.0%) was obtained.

A 100 mg portion of the above complex was deprotected by acid treatment (for removal of the Boc groups) in a similar manner to Example 1 to prepare a complex of N-acetylcarboxymethylchitosan—Gly-Phe-Phe-H, (89 mg).

Figure 22:
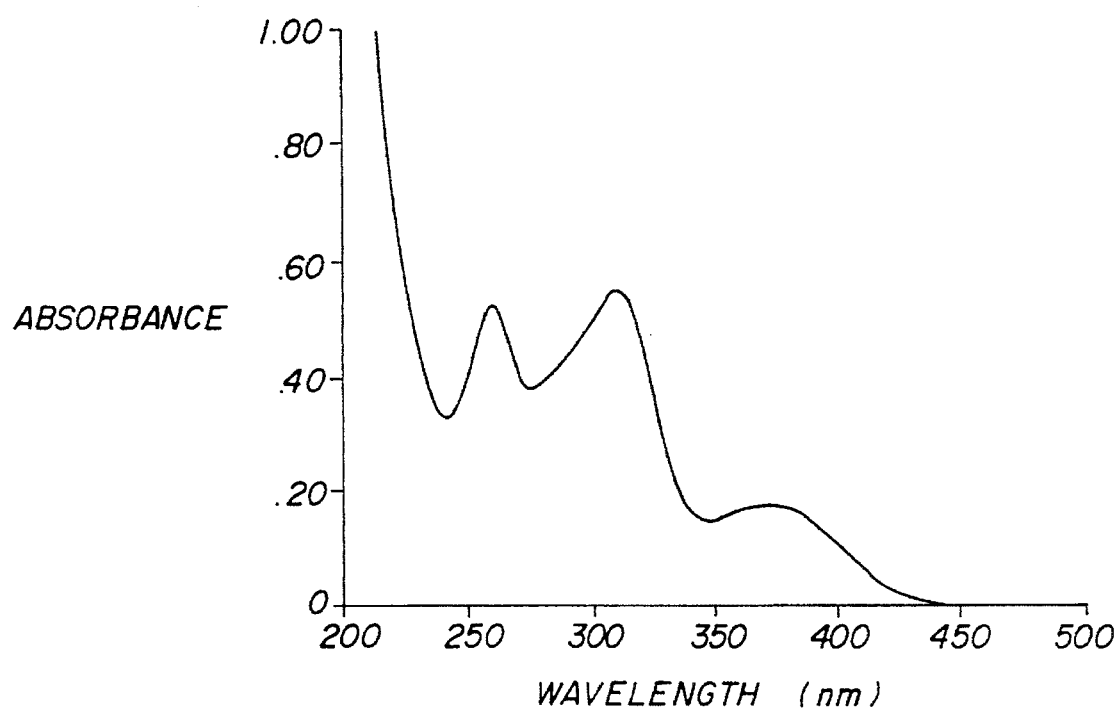
FIG. 22 shows an ultraviolet-visible absorption spectrum of the N-acetylcarboxymethylchitosan—Gly-Phe-Phe-MTX complex (with its carboxymethylation degree of 0.7) as obtained in Example 12 of this invention (at a concentration of the complex of 100 µg/ml in aqueous 0.1% $NaHCO_3$ as solvent)
Figure 23:
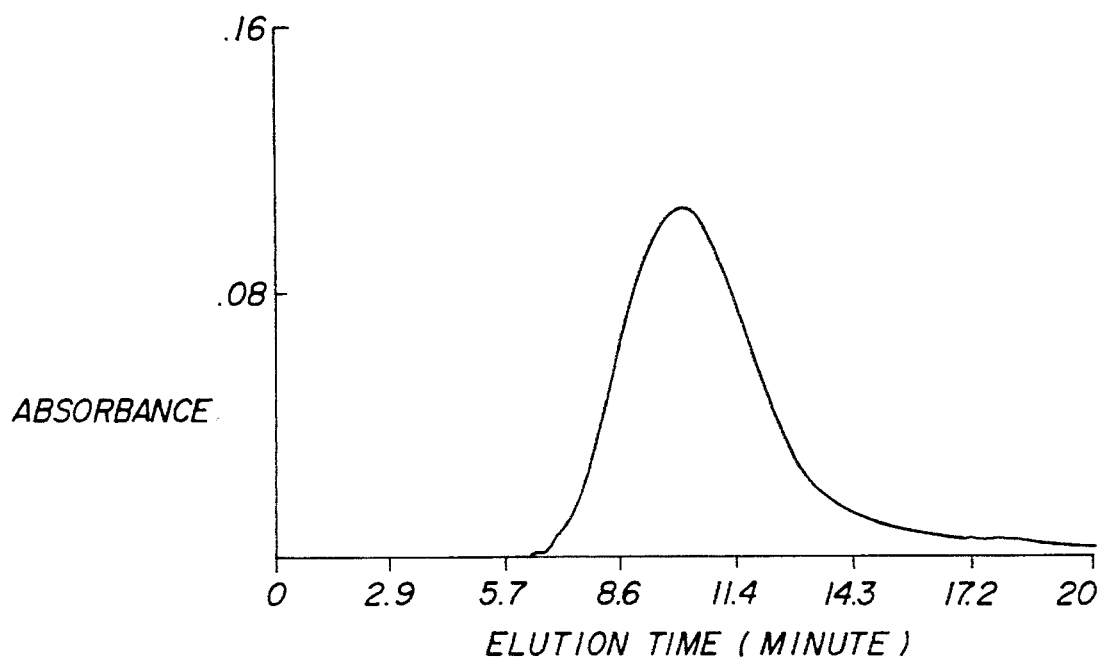
FIG. 23 depicts a GFC elution pattern of the N-acetylcarboxymethylchitosan—Gly-Phe-Phe-MTX complex (with its carboxymethylation degree of 0.7) as obtained in Example 12 of this invention (with detection of the complex being made by ultraviolet absorption at 307 nm)

A 75 mg portion of this complex was dissolved in 1% aq. NaHCO$_3$ solution (7.5 ml), to which was then added the active ester of methotrexate (MTX) (75 mg). The reaction was made at 4° C. for 24 hours to link MTX to the N-terminals of the peptide moiety of the complex. The reaction solution obtained was added to ethanol (40 ml). The resulting precipitate was collected and then dried in vacuo, so that a complex of N-acetyl-carboxymethylchitosan—Gly-Phe-Phe—MTX (75 mg, with an MTX content of 10.1 wt. %) was obtained as yellow powder. Ultraviolet-visible absorption spectrum and GFC elution pattern of this complex are shown in FIG. 22 and FIG. 23 of the accompanying drawings, respectively.

EXAMPLE 13

2.0 g of carboxymethylchitin (its carboxymethylation degree was 0.7) were dissolved in 0.05M acetate buffered solution (pH 6.0, 200 ml), to which egg white lysozyme (2.5 mg) was then added. The resulting solution was kept at 37° C. for 1.5 hours for the reaction, whereby a depolymerised carboxymethylchitin was obtained. This depolymerised carboxymethylchitin was then treated with aqueous 1N NaOH in a similar manner to Example 1 to afford 1.72 g of partially N-acetylated carboxymethylchitosan having a molecular weight of about $3 \times 10^5$ (as measured using dextran as a standard substance). This partially N-acetylated carboxymethylchitosan (150 mg) was dissolved in 0.5% aq. NaHCO$_3$ solution (15 ml) and then reacted with an active ester of an N-protected peptide of formula N-Boc-Ala-Gly-Gly-Gly-OH,(135 mg) in a similar manner to Example 1, to prepare a complex of N-acetylcarboxymethylchitosan—Gly-Gly-Gly-Ala-Boc, (150 mg). 140 mg portion of this complex was N-acetylated with acetic anhydride to produce a complex of N-acetylcarboxymethylchitosan—Gly-Gly-Gly-Ala-Boc, (154 mg). 130 mg portion of the latter complex was treated with acid to remove the Boc groups therefrom, so that a complex of N-acetylcarboxymethylchitosan—Gly-Gly-Gly-Ala-H (106 mg) was prepared. 95 mg portion of this complex was dissolved in 1% aq. NaHCO$_3$ solution (4.8 ml) and then reacted with the active ester of MTX (86 mg) in the resulting solution, to produce a complex of N-acetylcarboxymethylchitosan—Gly-Gly-Gly-Ala—MTX (88 mg, with an MTX content of 13.7 wt. %).

EXAMPLE 14

In a similar manner to Example 1, an active ester of an N-protected peptide of formula N-Boc-Gly-Gly-Gly-OH, (109 mg) was reacted with the partially N-acetylated carboxymethylchitosan (150 mg) as obtained in Example 12, to prepare a complex of partially-N-acetylated-carboxymethylchitosan—Gly-Gly-Gly-Boc, (167 mg). 150 mg of this complex was N-acetylated with acetic anhydride, so that a complex of N-acetylcarboxymethylchitosan—Gly-Gly-Gly-Boc, (153 mg) was prepared. A 130 mg portion of the latter complex was subjected to acid treatment to remove the Boc groups therefrom and prepare a complex of N-acetylcarboxymethylchitosan—Gly-Gly-Gly-H, (110 mg). This complex (100 mg) was reacted with the active ester of MTX (90 mg), whereby a complex of N-acetylcarboxymethylchitosan—Gly-Gly-Gly—MTX (111 mg, with an MTX content of 17.4 wt. %) was obtained.

EXAMPLE 15

In a similar manner to Example 1, an active ester of an N-protected peptide of formula N-Boc-Ala-Gly-Gly-Gly-OH (135 mg) was reacted with the partially N-acetylated carboxymethylchitosan (150 mg) as obtained in Example 12, to prepare a complex of partially-N-acetylated-carboxymethylchitosan—Gly-Gly-Gly-Ala-Boc, (162 mg). 150 mg of this complex was N-acetylated with acetic anhydride so that a complex of N-acetylcarboxymethylchitosan—Gly-Gly-Gly-Ala-Boc, (157 mg) was produced. 130 mg of the latter complex was subjected to acid treatment to remove the Boc groups therefrom and prepare a complex of N-acetylcarboxymethylchitosan—Gly-Gly-Gly-Ala-H, (114 mg). This complex (100 mg) was reacted with the active ester of MTX (90 mg), whereby a complex of N-acetylcarboxymethylchitosan—Gly-Gly-Gly-Ala—MTX (111 mg, with an MTX content of 17.4%) was obtained.

EXAMPLE 16

In a similar manner to Example 1, an active ester of an N-protected peptide of formula N-Boc-Gly-Phe-Gly-Gly-OH, (87 mg) was reacted with the partially N-acetylated carboxymethylchitosan (200 mg) as obtained in Example 12, to prepare a complex of partially N-acetylated-carboxymethylchitosan—Gly-Gly-Phe-Gly-Boc, (206 mg). 100 mg of this complex was N-acetylated with acetic anhydride so that a complex of N-acetylcarboxymethylchitosan—Gly-Gly-Phe-Gly-Boc (92 mg, with a content of the N-Boc-peptide of 7.4%) was prepared. 80 mg portion of the latter complex was subjected to acid treatment to remove the Boc groups therefrom and give a complex of N-acetylcarboxymethylchitosan—Gly-Gly-Phe-Gly-H, (71 mg). This complex (50 mg) was reacted with the active ester of MTX (45 mg), whereby a complex of N-acetylcarboxymethylchitosan—Gly-Gly-Phe-Gly—MTX complex (50 mg, with an MTX content of 7.0%) was obtained.

EXAMPLE 17

A 50 mg portion of the complex of partially-N-acetylated-carboxymethylchitosan—Gly-Phe-Phe-Boc (with its carboxymethylation degree of 0.7 and a content of the N-Boc-peptide of 13.2%), which was obtained in Example 12, was dissolved in 0.1% aq. $NaHCO_3$ solution (2.5 ml), to which was then added 2-O-mono-methoxypolyethylene glycol-3,5-dichloro-s-triazine (80 mg)(having a molecular weight of 5,000, a product of Sigma Corporation; hereinafter abbreviated as "$PEG_1$"). The reaction was conducted at 0° C. for 4 hours. Water (2.5 ml), sodium hydrogen carbonate (500 mg) and acetic anhydride (200 μl) were added to the resulting reaction solution which contained a produced complex of partially-N-acetylated-carboxymethylchitosan-($PEG_1$)—Gly-Phe-Phe-Boc, followed by reaction at 4° C. for 18 hours to complete the N-acetylation of said complex. The reaction solution obtained was dialyzed against water. The resultant non-dialysable solution was concentrated to 3 ml, to which acetone (90 ml) was added. The resulting precipitate was collected, washed with methylene chloride and then dried in vacuo to obtain a complex of N-acetylcarboxymethylchitosan-($PEG_1$)—Gly-Phe-Phe-Boc (72 mg, with the PEG content of 37%).

Figure 24:
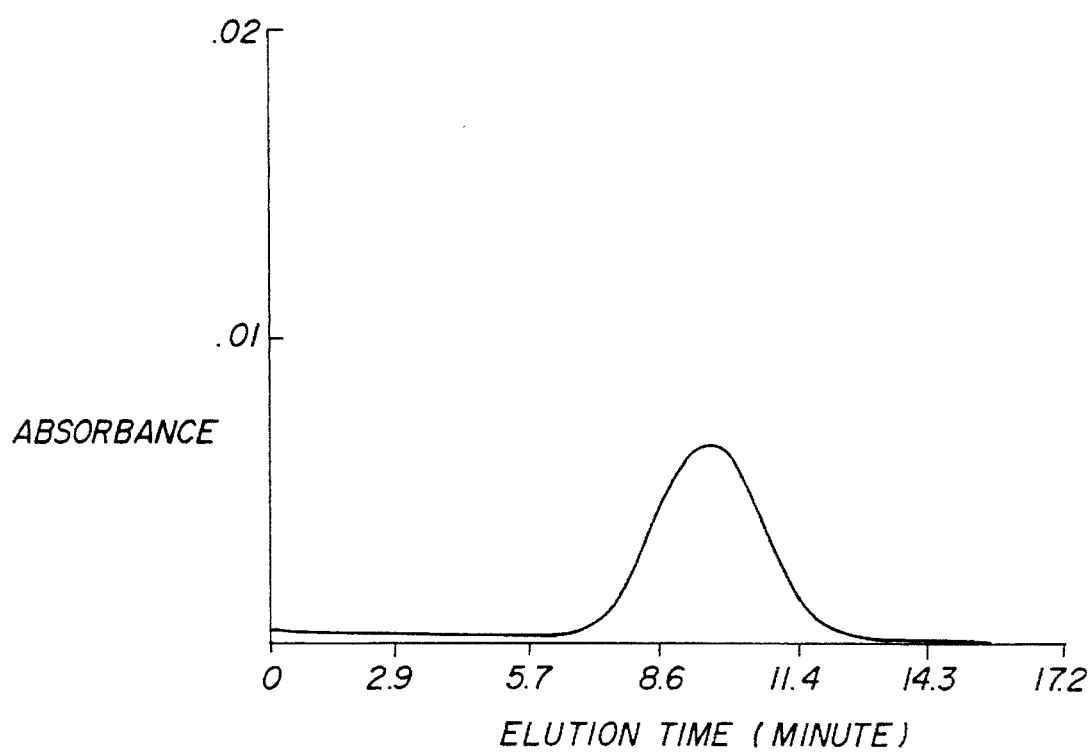
FIG. 24 depicts a GFC elution pattern of the N-acetylcarboxymethylchitosan—($PEG_1$)—Gly-Phe-Phe-H complex as prepared in Example 17 of this invention (with detection of the complex being made by ultraviolet absorption at 258 nm)
Figure 25:
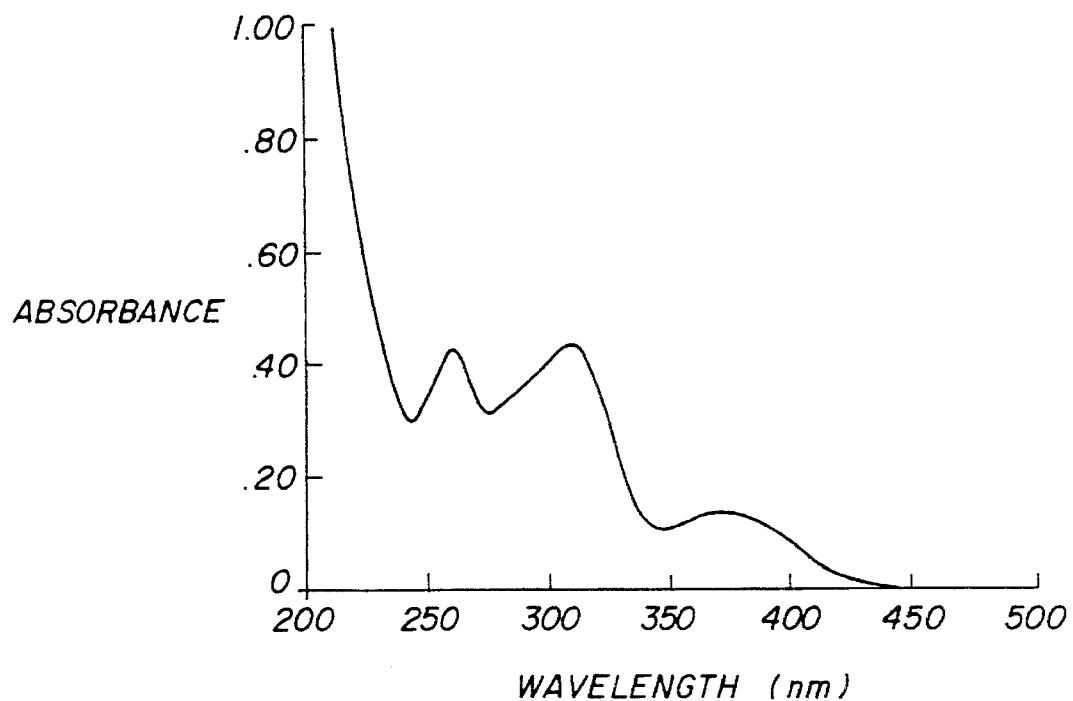
FIG. 25 shows an ultraviolet-visible absorption spectrum of the N-acetylcarboxymethylchitosan—($PEG_1$)—Gly-Phe-Phe—MTX complex obtained as the final product in Example 17 of this invention (at a concentration of the complex of 100 µg/ml in aqueous 0.1% $NaHCO_3$ as solvent)
Figure 26:
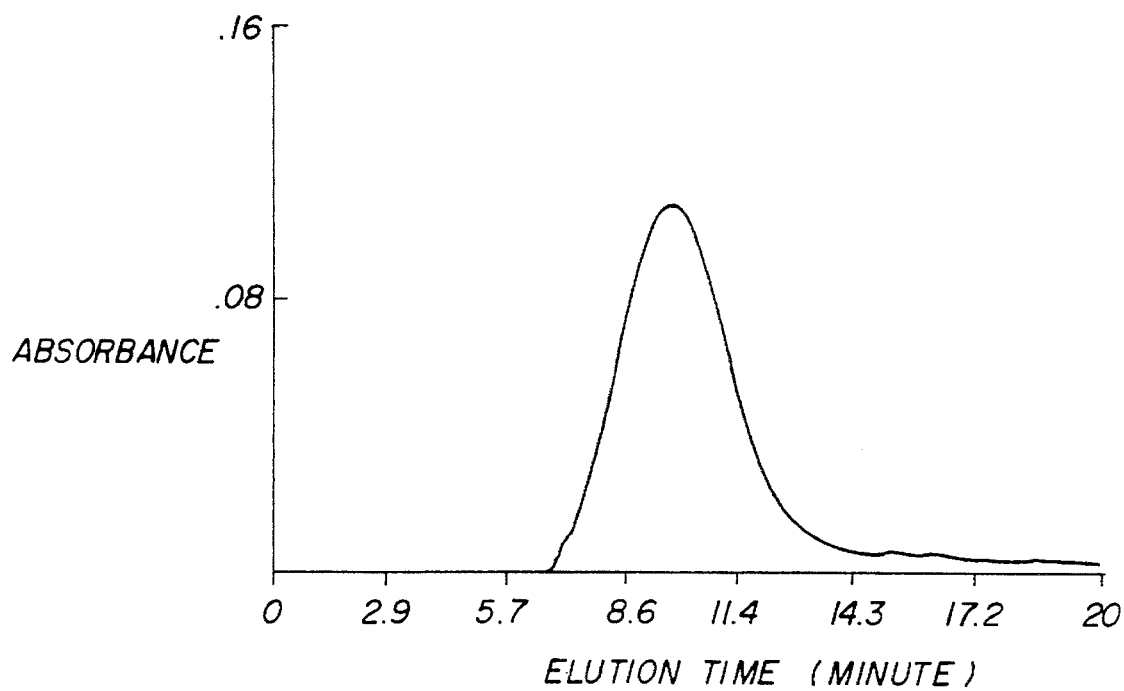
FIG. 26 depicts a GFC elution pattern of the N-acetylcarboxymethylchitosan—($PEG_1$)—Gly-Phe-Phe—MTX complex obtained as the final product in Example 17 of this invention (with detection of the complex being made by ultraviolet absorption at 307 nm)

This complex (60 mg) was dissolved in 0.5 N HCl (3.5 ml) and the resulting solution was kept at 30° C. for 16 hours to effect the reaction for removal of the Boc groups from said complex. The reaction solution obtained was added to a 1:2 mixed solvent (60 ml) of ethanol and ether. The resulting precipitate was collected, washed with methylene chloride, and then dried in vacuo, so that a complex of N-acetylcarboxymethylchitosan-($PEG_1$)—Gly-Phe-Phe-H (44 mg, with the PEG content of 26%) was obtained. A GFC elution pattern of this complex is presented in FIG. 24 of the accompanying drawings. This N-acetylcarboxymethylchitosan-($PEG_1$)—Gly-Phe-Phe-H complex (35 mg) was dissolved in 1% aq. $NaHCO_3$ solution (1.75 ml), to which the active ester of MTX (16 mg) was added. The reaction was conducted at 4° C. for 18 hours. The reaction solution obtained was dialyzed against water. The resultant non-dialysable solution was concentrated to 3 ml, followed by the addition of acetone (60 ml) thereto. The resulting precipitate was collected, washed with methylene chloride and then dried in vacuo, whereby a complex of N-acetylcarboxymethylchitosan-($PEG_1$)—Gly-Phe-Phe—MTX (29 mg, with the PEG content of 21% and an MTX content of 7.9%) was obtained in the form of yellow powder as one example of the derivatives of the formula (X). Ultraviolet-visible absorption spectrum and GFC elution pattern of the latter complex are shown in FIG. 25 and FIG. 26 of the accompanying drawings, respectively.

EXAMPLE 18

A 50 mg portion of the partially-N-acetylated-carboxymethylchitosan—Gly-Phe-Phe-Boc complex (with its carboxymethylation degree of 0.7 and a content of the N-Boc-peptide of 13.2%) which was obtained in Example 12 was dissolved in 0.1% aq. $NaHCO_3$ solution (2.5 ml), and to the resulting solution was added the $PEG_1$ (12 mg) as used in Example 17. By effecting the reaction in a similar manner to Example 17, a complex of N-acetylcarboxymethylchitosan-($PEG_1$)—Gly-Phe-Phe-Boc (49 mg, with the PEG content of 8.0%) was prepared. 40 mg of this complex was subjected to the deprotecting treatment for removal of the Boc groups therefrom, to afford a complex of N-acetylcarboxymethylchitosan-($PEG_1$)—Gly-Phe-Phe-H, (33 g). This complex (21 mg) was dissolved in 1% aq. $NaHCO_3$ solution (1.1. ml), to which was then added the active ester of MTX (9.5 mg). The resulting mixture was kept at 4° C. for 18 hours for the reaction. The reaction solution obtained was added to ethanol (11 ml). The resulting precipitate was collected, washed with methylene chloride and then dried in vacuo, whereby a complex of N-acetylcarboxymethylchitosan-($PEG_1$)—Gly-Phe-Phe—MTX (17 mg, with the PEG content of 6.1% and an MTX content of 8.5%) was obtained.

EXAMPLE 19

A 50 mg portion of the partially-N-acetylated-carboxymethylchitosan—Gly-Phe-Phe-Boc complex (with its carboxymethylation degree of 0.7 and a content of the N-Boc-peptide of 14.8%), which had been prepared according to Example 12 above, was dissolved in 0.1% aq. $NaHCO_3$ solution (5 ml), followed by addition of $PEG_1$ (200 mg) to said solution. By effecting the reaction in a similar manner to Example 17, a complex of N-acetylcarboxymethylchitosan-($PEG_1$)—Gly-Phe-Phe-Boc (100 mg, with the PEG content of 58%) was prepared. A 90 mg portion of the latter complex was subjected to the acid treatment for removal of the Boc groups, to give a complex of N-acetylcarboxymethylchitosan-($PEG_1$)—Gly-Phe-Phe-H (67 mg, with the PEG content of 45%). In a similar manner to Example 17, this complex (50 mg) was reacted with the active ester of MTX, whereby a complex of N-acetylcarboxymethylchitosan-($PEG_1$)—Gly-Phe-Phe—MTX (42 mg, with the PEG content of 43% and an MTX content of 6.3%) was obtained.

EXAMPLE 20

A 25 mg portion of a complex of partially-N-acetylated-carboxymethylchitosan—Gly-Gly-Phe-Gly-Boc (with its carboxymethylation degree of 0.7 and a content of the N-Boc-peptide of 7.9%), which had been prepared in a similar manner to Example 16, was dissolved in 0.1% aq. NaHCO$_3$ solution (1.25 ml), to which was added the PEG$_1$ (50 mg). By effecting the reaction in a similar manner to Example 17, a complex of N-acetylcarboxymethylchitosan-(PEG$_1$)—Gly-Gly-Phe-Gly-Boc (42 mg, with the PEG content of 42%) was prepared. 30 mg of this complex was subjected to the acid treatment for removal of the Boc groups, to afford a complex of N-acetylcarboxymethylchitosan-(PEG$_1$)—Gly-Gly-Phe-Gly-H, (20 mg). The latter complex was reacted with the active ester of MTX in a similar manner to Example 17, so that a complex of N-acetylcarboxymethylchitosan-(PEG$_1$)—Gly-Gly-Phe-Gly—MTX (11 mg, with the PEG content of 27% and an MTX content of 6.1%) was produced.

EXAMPLE 21

A 100 mg portion of the complex of partially-N-acetylated-carboxymethylchitosan—Gly-Phe-Phe-Boc (with its carboxymethylation degree of 0.7 and a content of the N-Boc-peptide of 14.8%), which had been prepared in a similar manner to Example 12, was dissolved in 0.5% aq. NaHCO$_3$ solution (10 ml), to which was then added dimethylformamide (8.5 ml) to give a uniform solution. To this solution was added an active ester (100 mg) of methoxy-polyoxyethylene carboxylic acid (with a molecular weight of 5000, a product of Sigma Corporation; hereinafter abbreviated as "PEG$_{co}$"), and the resulting solution was kept at 4° C. for 18 hours to effect the reaction to combine the PEG$_{co}$ chain with the non-N-acetylated amino groups which were present in the sugar units of said complex. The resulting reaction solution was dialyzed against water. Sodium hydrogen carbonate (3.6 g) and acetic anhydride (2.1 ml) were added to the resulting non-dialysable solution (27ml), followed by effecting the acetylation at 4° C. for 20 hours, so that the partially-N-acetylated-carboxymethylchitosan-(PEG$_{co}$)—Gly-Phe-Phe-Boc complex was N-acetylated. The reaction solution obtained was dialyzed against water. The resultant non-dialysable solution was concentrated to 6 ml, to which acetone (120 ml) was added. The resulting precipitate was collected, washed with methylene chloride and then dried in vacuo, to afford a complex of an N-acetylcarboxymethylchitosan-(PEG$_{co}$)—Gly-Phe-Phe-Boc (109 mg, with the PEG content of 9.0%). 50 mg portion of the latter complex was subjected to the acid treatment for removal of the Boc groups therefrom, to prepare a complex of N-acetylcarboxymethylchitosan-(PEG$_{co}$)—Gly-Phe-Phe-H (35 mg, with the PEG content of 4.7%). This complex (25 mg) was reacted with the active ester of MTX in a similar manner to Example 18, whereby a complex of N-acetylcarboxymethylchitosan-(PEG$_{co}$)—Gly-Phe-Phe—MTX (25 mg, with the PEG content of 4.5% and an MTX content of 9.1%) was produced.

EXAMPLE 22

With a partially N-acetylated carboxymethylchitosan (300 mg) which was prepared as in Example 1, was reacted an active ester of an N-protected peptide of formula N-Boc-Gly-Gly-Gly-OH (289 mg) in a similar mammer to Example 1, to prepare a partially-N-acetylated-carboxymethylchitosan—Gly-Gly-Gly-Boc complex (334 mg).

A 125 mg portion of this complex was dissolved in water (12 ml), to which was then added 3.3% aq. sodium metaperiodate (5 ml). The reaction was effected at room temperature for 4 hours in the dark. After the resulting reaction solution was dialyzed against water, the resulting non-dialysable solution was concentrated to about 12 ml, to which sodium borohydride (30 mg) was added. The reduction reaction was then effected overnight. The pH of the resulting reaction solution was lowered to 4.5 and thereafter was raised back to 8.0 and then added into ethanol (60 ml). The resulting precipitate was collected and then dried in vacuo, whereby there was prepared a complex of N-acetylcarboxymethylchitosan—Gly-Gly-Gly-Boc (77 mg), of which some pyranose rings had been opened and which was converted into the derivative of a polyol.

Figure 27:
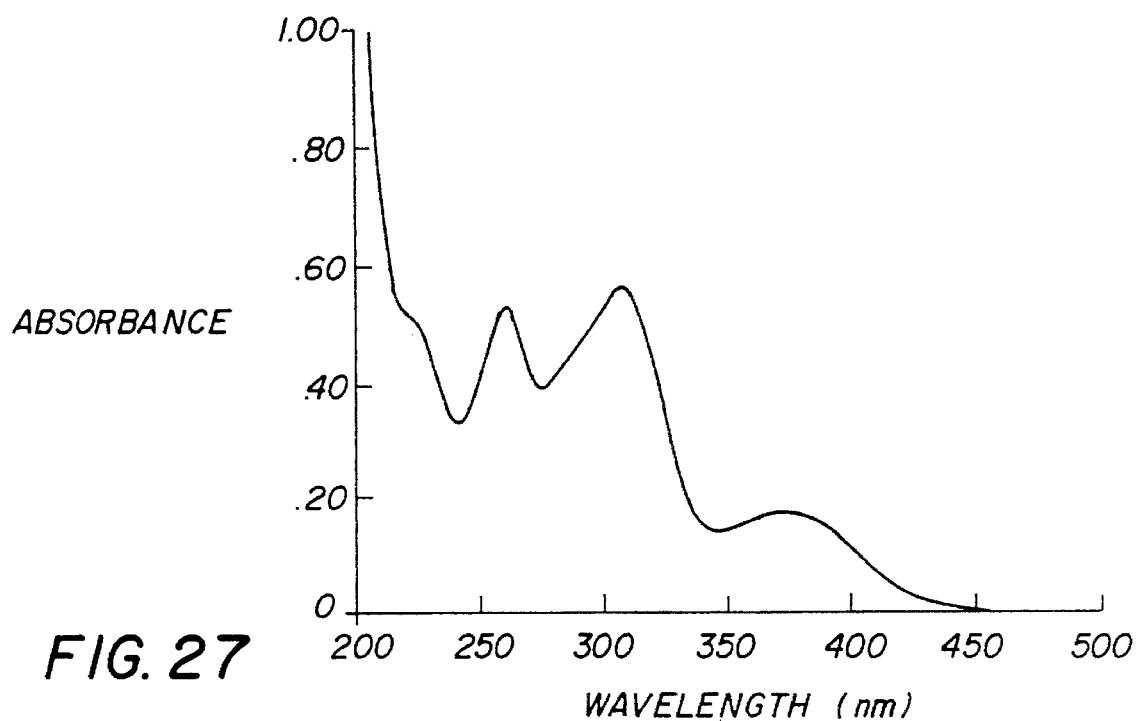
FIG. 27 shows an ultraviolet-visible absorption spectrum of the N-acetylcarboxymethylchitosan—Gly-Gly-Gly—MTX complex as converted into a polyol derivative which was obtained in Example 22 of the present invention (at a concentration of the complex of 40 µg/ml in aqueous 0.1% $NaHCO_3$ as solvent)
Figure 28:
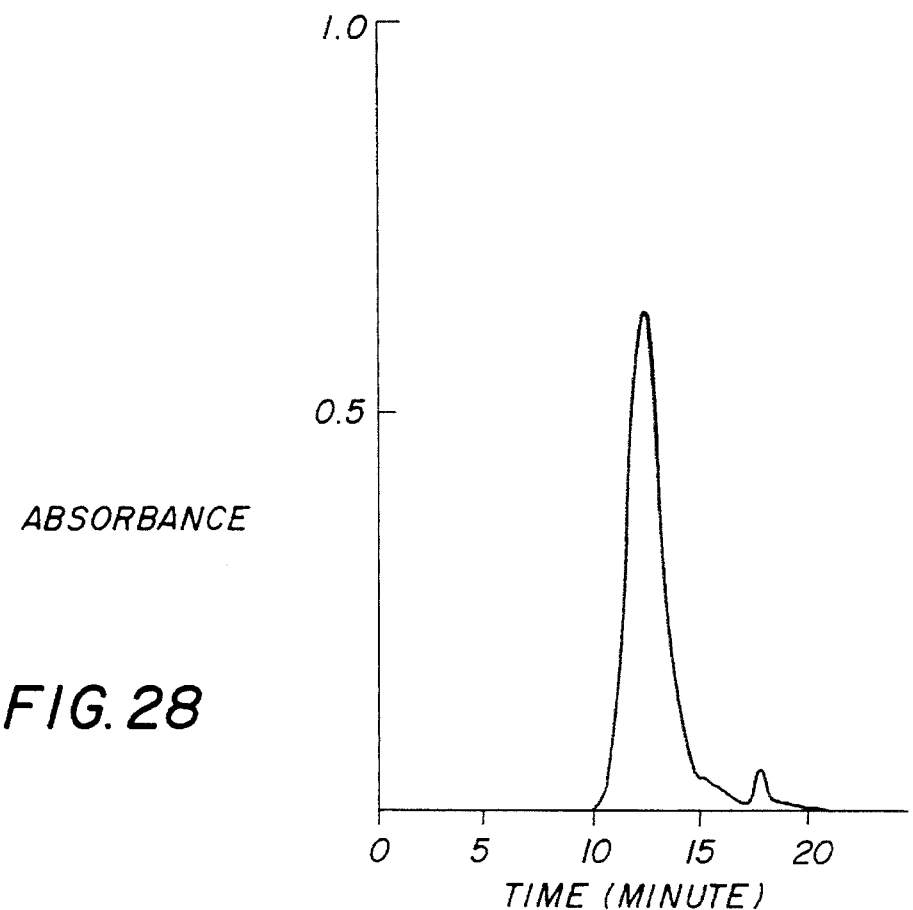
FIG. 28 depicts a GFC elution pattern of the N-acetylcarboxymethylchitosan—Gly-Gly-Gly—MTX complex as converted into a polyol derivative which was obtained in Example 22 of this invention (with detection of the complex being made by ultraviolet absorption at 307 nm)

A 60 mg portion of this complex was subjected to the acid treatment in a similar manner to Example 1 to remove the Boc groups from the complex, whereby a complex of N-acetylcarboxymethylchitosan—Gly-Gly-Gly-H as converted into a polyol derivative was prepared (yield: 46 mg). An active ester of MTX (46 mg) was reacted with 35 mg of the latter complex to produce a complex of N-acetylcarboxymethylchitosan—Gly-Gly-Gly—MTX as converted into a polyol derivative (42 mg, with an MTX content of 29%). Ultraviolet-visible absorption spectrum and GFC elution pattern of the last-mentioned complex are shown in FIG. 27 and FIG. 28 of the accompanying drawings respectively.

EXAMPLE 23

With a partially N-acetylated carboxymethylchitosan (250 mg) which was prepared similarly to Example 1, was reacted an active ester of an N-protected peptide of formula N-Boc-Gly-Phe-Phe-Gly-OH (527 mg) in a similar manner to Example 1, to prepare a complex of partially-N-acetylated-carboxymethylchitosan—Gly-Phe-Phe-Gly-Boc, (327 mg). A 200 mg portion oft his complex was subjected to periodate oxidation and then reduced in a similar manner to Example 22 above. Thus, a complex of N-acetylcarboxymethylchitosan—Gly-Phe-Phe-Gly-Boc which had been converted into the polyol derivative (113 mg, with a content of the N-Boc-peptide of 28%) was prepared.

A 60 mg portion of the latter complex was subjected to the acid treatment in a similar manner to Example 1 to remove the Boc groups from said complex. Thereby, a complex of N-acetylcarboxymethylchitosan—Gly-Phe-Phe-Gly-H which was converted into the polyol derivative (36 mg, with a peptide content of 24%) was prepared. This complex (30 mg) was reacted with the active ester of MTX (55 mg) to produce a complex of N-acetylcarboxymethylchitosan—Gly-Phe-Phe-Gly—MTX (22 mg, with an MTX content of 19%) which was converted into the polyol derivative. With respect to this complex, the MTX/peptide molar ratio in said complex and its value of a/(a+b) as defined for the formula (I) were 0.93 and 0.19 as calculated by the aforesaid equations (5) and (1), respectively.

Properties of the derivatives having the formula (I), (X) or (XI) according to this invention were tested by the following Experiments 1-4.

EXPERIMENT 1

Samples and Test Procedures

The N-acetylcarboxymethylchitosan—Gly-Phe-Phe—MTX complex obtained in Example 1, as well as the N-acetylcarboxymethylchitosan—Gly-Gly-Gly—MTX complex obtained in Example 2 were taken as test samples and individually dissolved in physiological saline to prepare two solutions of 400 µg/ml of the sample. To plasma (190 µl) which had been obtained by centrifuging a volume of blood collected from several mice was added a 10 μl portion of each solution of the sample, followed by reaction at 37° C. From the resulting reaction mixture were separated test solutions at intervals of time. After each test solution of the reaction mixture was deproteinized, the test solutions were analyzed by gel filtration chromatographic method (using a column of TSK-gel G4000 PW$_{XL}$, as eluted with 0.1M NaCl at flow rate of 0.8 ml/min. and at column temperature of 40° C., while the detection being made by ultraviolet absorption (at 307 nm), so that the percentages of the residual content of MTX, which retained the initial form of its complex within the plasma were evalutated.

Test Results

Figure 16:
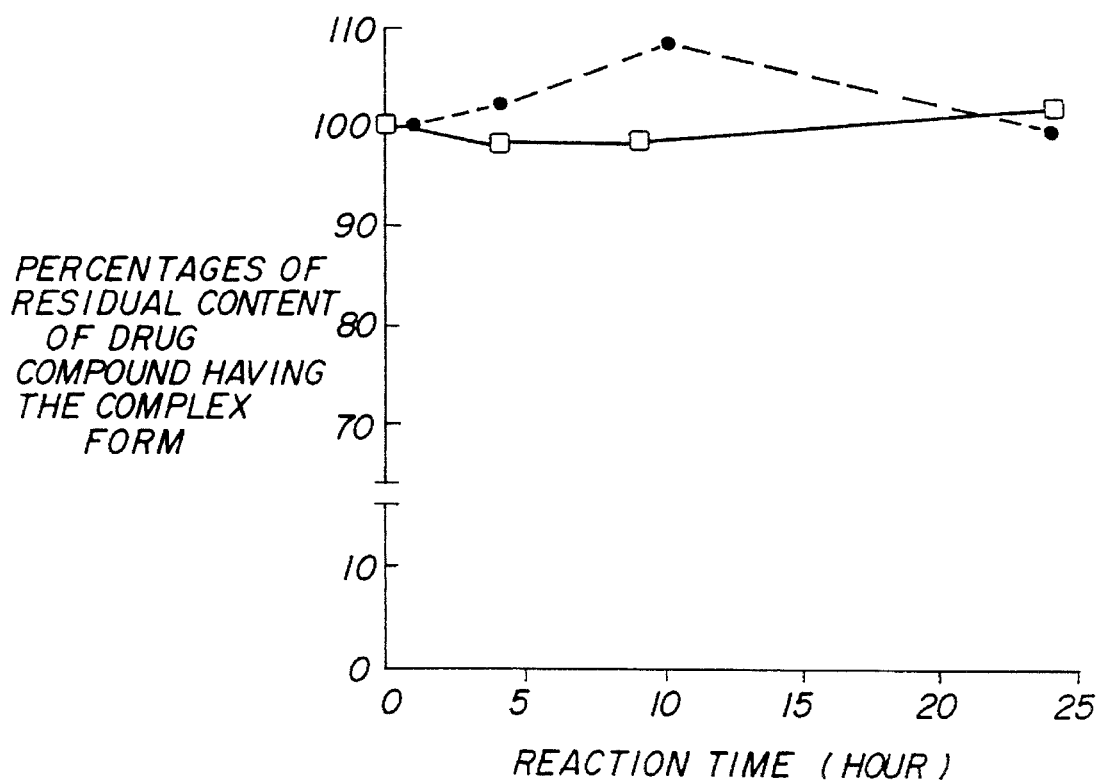
FIG. 16 is a graph showing time-dependent variations in the percentages of the residual content of the pharmaceutical compound, methotrexate (MTX), having retained the form of its complex with the chitosan within plasma (in vitro), which were measured in Experiment 1 of this invention.

The test results are plotted in FIG. 16 of the accompanying drawings, which is a graph showing time-dependent variations in the percentages of the residual content of MTX, which was present in the plasma with retaining the form of the complex represented by the formula (I). In this graph, the broken line with dots (●) indicates the test results obtained with the N-acetylcarboxymethylchitosan—Gly-Phe-Phe—MTX complex, while the full line with squares (□) indicates the test results obtained with the N-acetylcarboxymethylchitosan—Gly-Gly-Gly—MTX complex.

It is observed from FIG. 16 that the above two complexes are practically free from their degradation in the blood circulation and remain stable in the blood.

EXPERIMENT 2

Samples and Test Procedures

The N-acetylcarboxymethylchitosan—Gly-Phe-Phe—MTX complex (1 mg) obtained in Example 1, as well as the N-acetylcarboxymethylchitosan—Gly-Gly-Gly—MTX complex obtained in Example 2 were taken as test samples and individually reacted in 0.1M acetate buffer (pH 6.0, 1 ml) at 37° C. in the presence or absence of egg white lysozyme (10 μg). From the reaction mixture at the ends of 1, 3, 6 and 23 hours were taken test solutions, which were then analyzed by gel filtration chromatographic method as described in Experiment 1. In this way, prolongation in the elution time of the complex (upon the gel filtration) as involved by decrease in the molecular weight of the complex dut to the degradation of its N-acetylcarboxymethylchitosan moiety was evaluated.

Test Results

Figure 17:
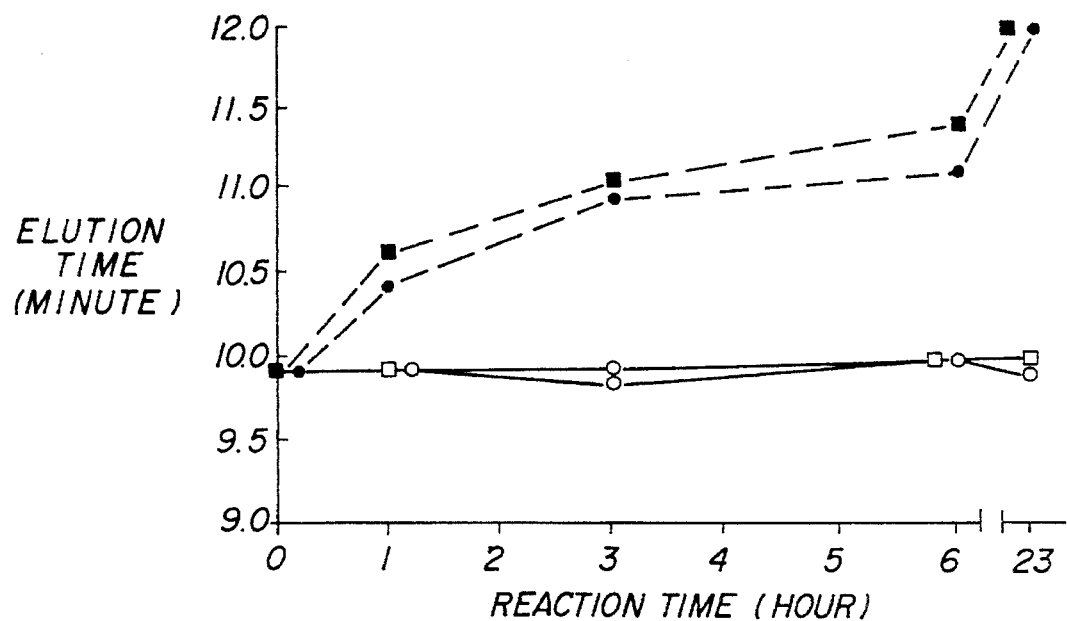
FIG. 17 is a graph showing how the reaction time of the degradation of the complexes of this invention by reacting with an acetate buffer was co-related to the elution time at which the elution of a peak of the complex appeared upon the elution of the reaction mixture at the different time points of the reaction time when the measurement was done in Experiment 2 of this invention.

The test results are plotted in FIG. 17 of the accompanying drawings, which is a graph showing how the reaciton time was co-related to the elution time at which the elution of a peak of the complex appeared upon the elution of the reaction mixture at the different points of the reaction time. In the graph, the line with circles (o) and the broken line with dots (●) indicate respectively the test results obtained with the N-acetylcarboxymethylchitosan—Gly-Phe-Phe—MTX complex tested in the absence of lysozyme and tested in the presence of lysozyme. While, the line with squares (□) and the broken line with solid squares (■) indicate respectively the test results obtained with the N-acetylcarboxymethylchitosan—Gly-Gly-Gly—MTX complex tested in the absence of lysozyme and tested in the presence of lysozyme.

It is observed from FIG. 17 that the N-acetylcarboxymethylchitosan moiety of the tested complexes undergone the degradation under the action of lysozyme and, as a result, the complexes were both decreased in their molecular weight. Therefore, it is expected that the complexes cannot remain for a too long time in the body.

EXPERIMENT 3

Samples

The N-acetylcarboxymethylchitosan—Gly-Gly-Gly—MTX complex of Example 2, in which the MTX portion had been $^3$H-labeled, was used as a test sample compound. In addition, an $^3$H-labeled product of the partially N-acetylated carboxymethylchitosan as obtained in the course of the process of Example 1 was employed as a referential sample.

Test Procedures

In the following experiment, there were employed tumor-bearing male ICR mice which had received subcutaneous implantation of Sarcoma 180 and subsequently had been raised for 10 days. The test sample compound was dissolved in physiological saline. Using three mice per group, the solution of the test sample compound was administered at a dose of 20 mg/Kg through the caudal vein. At the ends of 15 minutes, 30 minutes, 1 hour, 2 hours, 6 hours and 24 hours after the administration, the femoral artery and femoral vein of the mice of the respective groups were cut to collect blood samples. The radioactivity of a serum sample, which had been obtained by centrifuging each of the blood samples, and the radioactivity of a cancer tissue taken from the corresponding mouse were measured by the combustion method. In this way, the concentrations of the test sample compound present in the serum and the cancer tissue were evaluated.

Test Results

Figure 18:
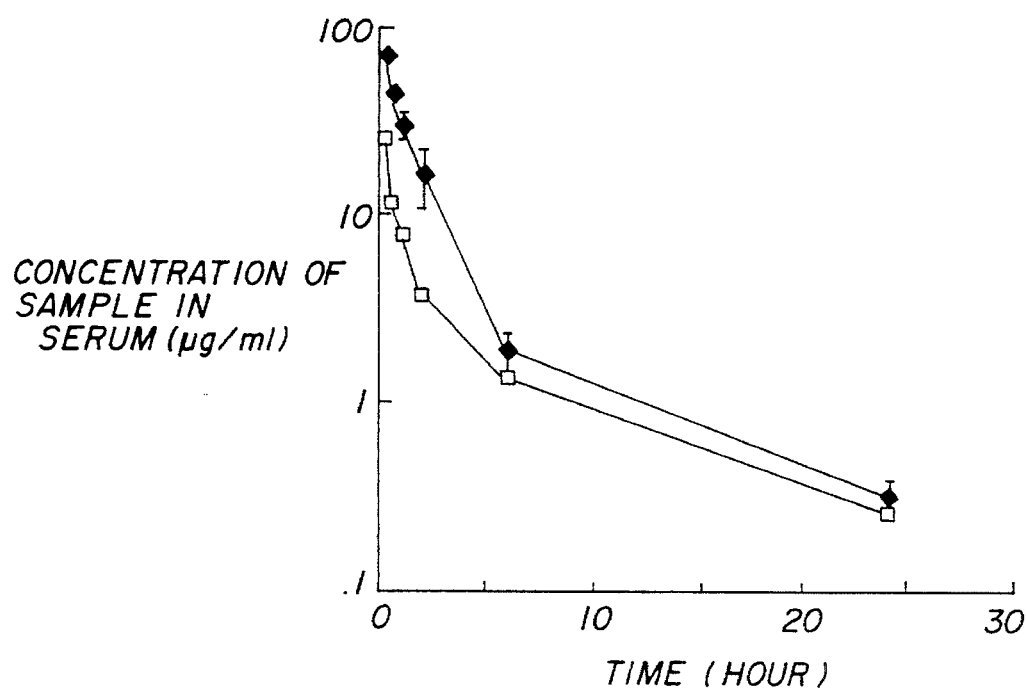
FIG. 18 is a graph showing time-dependent variations in the concentration or level of a test sample compound present in blood serum (in vivo) when the measurement was done in Experiment 3 of this invention.
Figure 19:
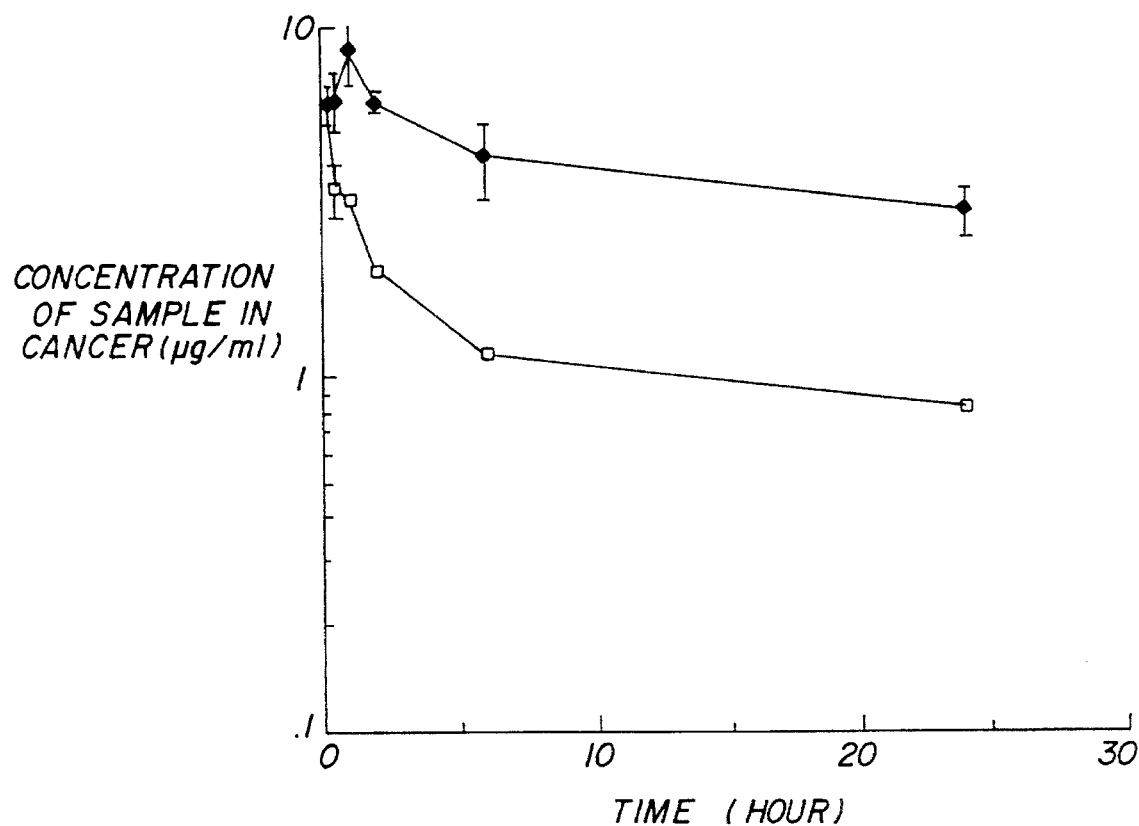
FIG. 19 is a graph showing time-dependent variations in the concentration of a test compound present in the cancer tissue when the measurement was done in Experiment 3 of this invention.

The test results are plotted in FIGS. 18 and 19 of the accompanying drawings. FIG. 18 is a graph showing time-dependent variations in the concentration of the test sample compound present in the blood serum, whereas FIG. 19 is a graph showing time-dependent variations in the concentration of the test sample compound present in the cancer tissue. In both of the graphs, the line with squares (□) show the results obtained with the referential sample, whereas the line with dots (●) show the results obtained with the test sample complex.

It is understood from FIG. 18 that the test sample complex would be expected to promptly disappear in the blood circulation because it was in the form of a complex having MTX linked to the polysaccharide (N-acetylcarboxymethylchitosan) via the peptide chain of the complex, but that, contrary to the expectation, however, the retention in blood of the test sample compound having the form of the complex is actually comparable to or longer than the retention of the simple polysaccharide which was used as the referential sample having no MTX and peptide chain thereto, and which is namely the N-acetylcarboxymethylchitosan itself. It is also observed from FIG. 19 that, as compared with the above-mentioned simple polysaccharide, the test sample complex can be newly imparted with such property that the complex can concentrate in a cancer tissue owing to the possession of the peptide chain by the complex. Therefore, it is feasible that the substance of the formula (I) according to this invention gains the tendency of organotropism by selection of a suitable peptide chain (—X—) to be contained in the substance of the formula (I) according to this invention.

EXPERIMENT 4

In this Experiment, the following experiments were conducted using several examples of the invention substances of the formula (X) as test samples.

Thus, the complexes which were obtained as the final products of Examples 17, 18 and 19 above and had the polyethylene glycol (PEG) contents of 6%, 21% and 43%, respectively, and of which the MTX portions were labelled with $^3H$, were prepared and employed as the $^3H$-labeled test compounds for use as Test Samples 1, 2 and 3. Further, the complexes same as those above-mentioned complexes except that the PEG portion was eliminated therefrom and the MTX portion was $^3H$-labeled, were also prepared and used as referential $^3H$-labeled compounds. In each of the complexes used as Test Samples 1, 2 and 3 and the complexes used as the referential complexes, the peptide chain which was bonded to the 2-amino group of the carboxymethylglucosamine unit of these tested complexes was Gly-Phe-Phe. The PEG portion present in the complexes as Test Samples 1, 2 and 3 was the $PEG_1$ (molecular weight: 5,000) as described in Example 17.

Test Procedures

In the following experiment, there were employed such tumor-bearing female Wistar rats which had received the subcutaneous transplantation of cancer cells, Walker 256, to an inguinal part and subsequently had been raised for 6 days. Each solution of the test sample was prepared for administration, by suitably diluting the $^3H$-labeled test sample complex with a solution of a corresponding non-radioactively labeled complex in physiological saline. Using three rats per group, the solution of the test sample was administered into the carotids of rats at a dose of 10 mg/Kg of the complex.

Under ether anesthesia, blood was sampled from the carotid of rats periodically at the ends of 30 minutes, 1 hour, 2 hours, 4 hours and 6 hours after the administration, and the blood was centrifuged to separate the plasma. Upon elapsed time of 24 hours after the administration, blood was collected from rats under ether enesthesia until the rats were sacrificed under exsanguination. Several tissues and organs were separated from the sacrificed rats. After weighing the whole or some parts of the tissues and organs, their radioactivities were measured.

The radioactivity of the tissues separated was measured in the following manner. After each sample of tissue was collected in a combustion cone and was dried, the sample was combusted in an automatic sample-combusting apparatus ("ASC-113", ALOKA). The resulting $^3H_2O$ was added to a scintillator ("AQUASOL-2", NEN) and then measured by liquid scintillation counter ("LSC-3600", ALOKA). The value of radioactivity so measured was calibrated by the external standard radiation source method.

Test results

Figure 29:
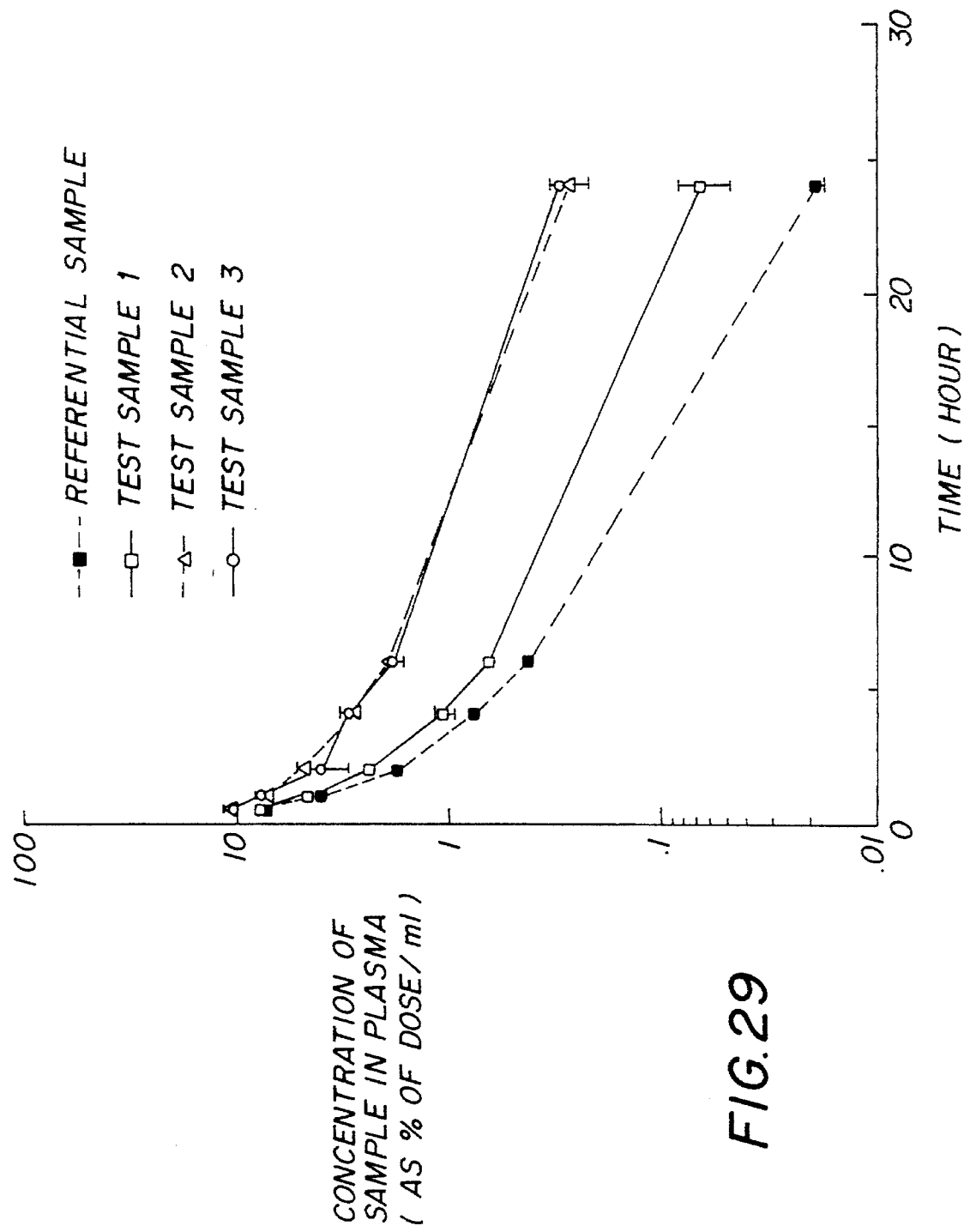
FIG. 29 is a graph showing time-dependent variations in the concentrations of various sample complexes present in the plasma of rats as measured up to the end of 24 hours after administration of the complexes when the measurement was done in Experiment 4 of this invention.
Figure 30:
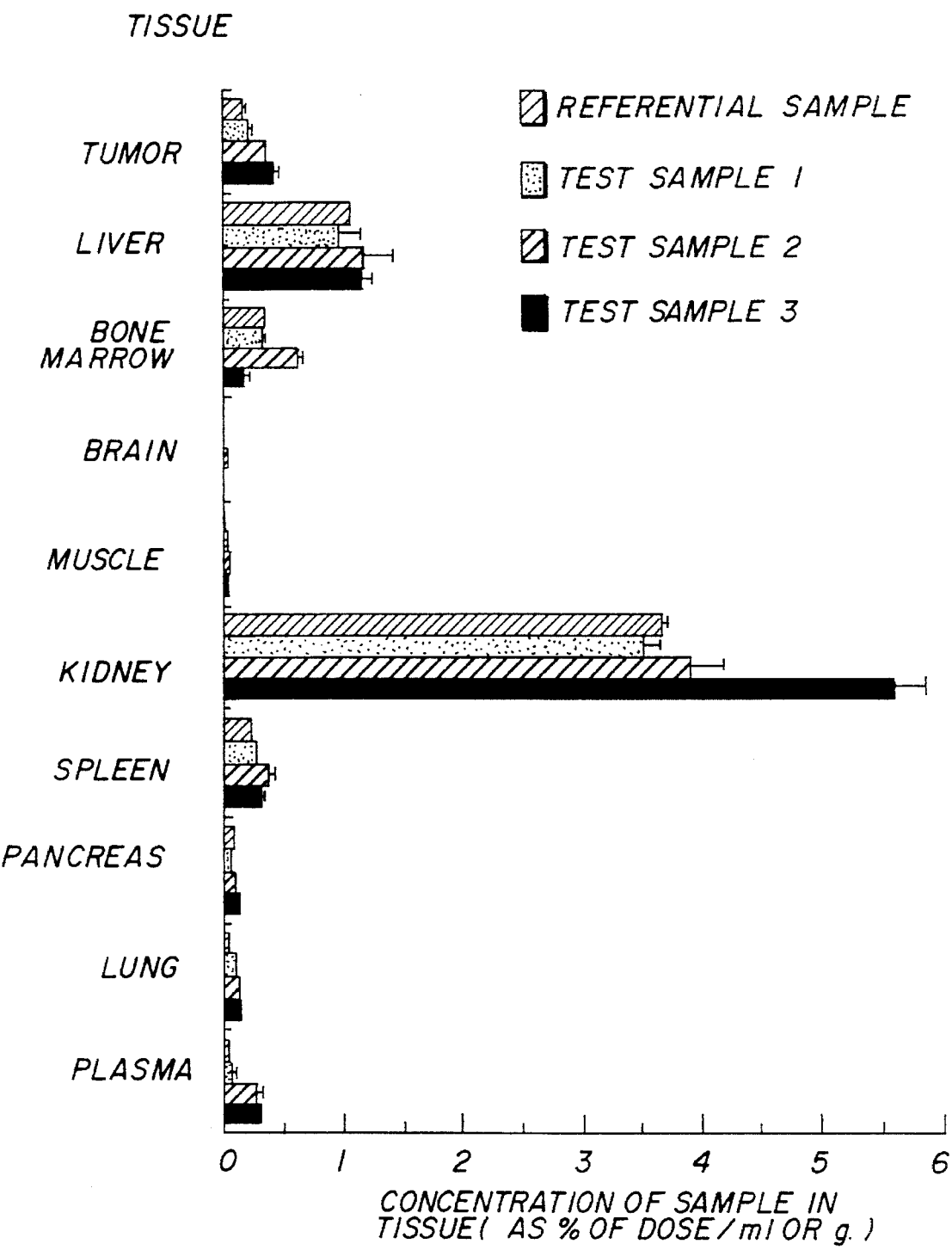
FIG. 30 is a graph showing the distributions of various sample complexes which were present in different tissues of bodies of rats, and which were expressed as the concentration of the complex in terms of the percentages on the basis of the dose of each complex.

The test results are presented in FIG. 29 and FIG. 30 of the accompanying drawings as well as in Table 1 given hereinafter. FIG. 29 is a graph showing time-dependent variations in the concentration of each sample complex present in the plasma as measured up to the end of 24 hours after the administration of the complex. FIG. 30 is a graph showing the distributions of each sample complex present in tissues of the rat body which are expressed as the concentration of the complex in term of the percentages on the basis of the dose of the complex. Table 1 shows the AUC value of each sample complex as evaluated on the basis of the graph of FIG. 29 and also shows the concentration of each sample complex in the tumor as expressed in percentages relative to the dose of the complex.

As is indicated by FIG. 29, the tested complex samples exhibits that the complex has a better retention in the blood circulation as the proportion of the PEG introduced in the complex becomes greater. When this is reviewed with reference to the AUC values of Table 1, it is understood that, as compared with the referential complexes, the retention of the Test Sample complexes in the blood was increased much by about 1.3 times with Test Sample 1 (having the introduced PEG content of 6%) and by about 3 times with Test Sample 2 (having the introduced PEG content of 21%) and also with Test Sample 3 (having the introduced PEG content of 43%).

As is envisaged from FIG. 30, it is also recognized that, in regard to the tumor tissue, the concentrations of the tested complexes present in the tumor can steadily increase with the higher content of the introduced PEG of the complexes, whereas in regard to the organs other than the tumor tissue, the concentrations of the tested complexes in these organs are not distinctly different from each other, depending on the content of the introduced PEG of the complexes. Specifically, this is as revealed from the values of the concentrations of the tested complexes in the tumor shown in Table 1. Thus, the introduction of the PEG moiety into an N-acetylcarboxymethylchitosan derivative can result in that the complex gains appearance of a tendency of the complex to recognize a cancer tissue. Therefore, use of such complex having an PEG content makes it possible to reduce the required dose of an anticancer agent and hence to reduce undersirable effects of the anticancer agent on other organs.

TABLE 1

| Sample | $AUC_{0-\infty}$ in Plasma (% of dose · hr/ml) | Concentration of Sample in Tumor (% of dose/g at end of 24 hrs) |
|---|---|---|
| Referential Sample | 15.83 | 0.18 |
| Test Sample 1 | 20.85 | 0.22 |
| Test Sample 2 | 46.20 | 0.35 |
| Test Sample 3 | 45.52 | 0.44 |

Industrial Utility of the Invention

The novel N-acetylcarboxymethylchitosan derivatives according to this invention are intended to achieve the in vivo targeting of pharmaceutical compounds. The novel derivatives of this invention are useful as high-molecular carriers of polysaccharide-type which are capable of enhancing the stability of such pharmaceutical compounds in blood, the organotropism of such pharmaceutical compounds and the biodegradability of such pharmaceutical products. Further, the novel N-acetylcarboxymethylchitosan derivatives of this invention as provided in the form of their complexes having linked to pharmaceutical compounds have organotropism and have also other advantageous properties and hence are useful as pharmaceutical products.

We claim:

1. An N-acetylcarboxymethylchitosan derivative represented by the following formula (Ia):

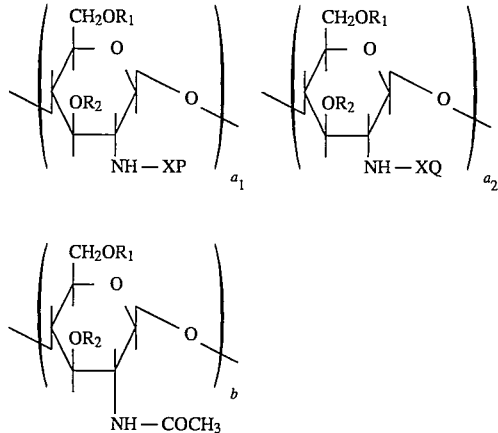

(Ia)

wherein $R_1$ and $R_2$ individually mean H or carboxymethyl group with the proviso that $R_1$ and $R_2$ do not stand for H at the same time, P denotes such residue of methotrexate which is formed by removal of an —OH group from any one of the two carboxyl groups of methotrexate as represented by the formula:

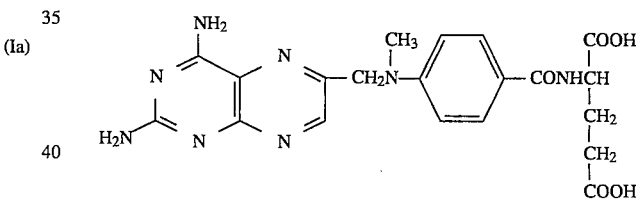

and Q stands for H, X represents a peptide chain having the formula -Gly-Gly-Gly- and terminated by —NH— towards P or Q; $a_1$ represents a positive integer and $a_2$ represents zero, and b stands for a positive integer; and wherein $a_1$ and b are selected so that said N-acetylcarboxymethylchitosan derivative has the following characteristic values (1)–(4):

| | |
|---|---|
| (1) carboxymethylation degree: | 1.0 |
| (2) molecular weight (as measured by gel filtration method): | $1 \times 10^5$ |
| (3) a/(a + b): [provided that a = $a_1 + a_2$] | 0.2 |
| (4) P/X ratio (molar ratio): | 1.0 |

2. An N-acetylcarboxymethylchitosan derivative represented by the following formula (Ib):

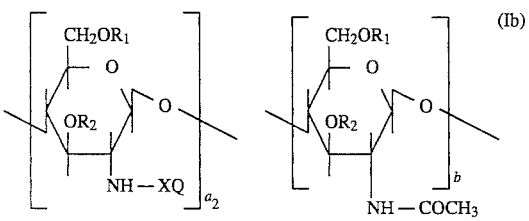

wherein $R_1$ and $R_2$ individually mean H or carboxymethyl group; with proviso that $R_1$ and $R_2$ do not stand for H at the same time, Q stands for H or a group —OH, X represents a chain of the formula $$-(Suc)_q-X'-$$

where Suc means the succinic acid residue of the formula —OC—$CH_2$—$CH_2$—CO—, q is an integer of zero or 1 and X' means a peptide chain containing two to six amino acids such that when q is zero, said peptide chain —X'— is terminated by —NH— towards Q and Q is H, and such that when q is 1, said peptide chain —X'— is terminated by —CO— towards Q and Q is —OH;

$a_2$ represents a positive integer, and b stands for a positive integer; and wherein $a_2$ and b are selected so that said N-acetylcarboxymethylchitosan derivative has the following characteristic values (1)–(3):

| | | |
|---|---|---|
| (1) | carboxymethylation degree: | 0.5–1.2 |
| (2) | molecular weight (as measured by gel filtration method): | 3,000–300,000 |
| (3) | $a_2/(a_2 + b)$: | 0.01–1. |

3. An N-acetylcarboxymethylchitosan derivative represented by the following formula (Ib-1):

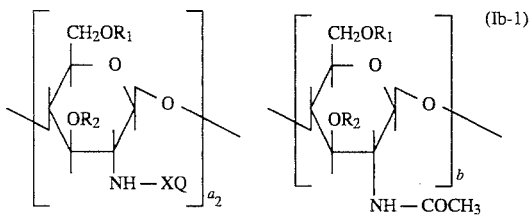

wherein $R_1$ and $R_2$ individually mean H or carboxymethyl group; with the proviso that $R_1$ and $R_2$ do not stand for H at the same time, Q stands for H or a group —OH, X represents a peptide chain containing two to six amino acids and terminated by —NH— towards Q where Q is H, or X represents a chain of the formula $$-(Suc)-X-$$

where Suc means the succinic acid residue of the formula —OC—$CH_2$—$CH_2$—CO— and X' means a peptide chain containing two to six amino acids and terminated by —CO— towards Q where Q is —OH, $a_2$ represents a positive integer, and b stands for a positive integer; and wherein $a_2$ and b are selected so that said N-acetylcarboxymethylchitosan derivative has the following characteristic values (1)–(3):

| | | |
|---|---|---|
| (1) | carboxymethylation degree: | 0.5–1.2 |
| (2) | molecular weight (as measured by filtration method): | 3,000–300,000 |
| (3) | $a_2/(a_2 + b)$: | 0.01–1. |

4. An N-acetylcarboxymethylchitosan derivative represented by the following formula (Ic):

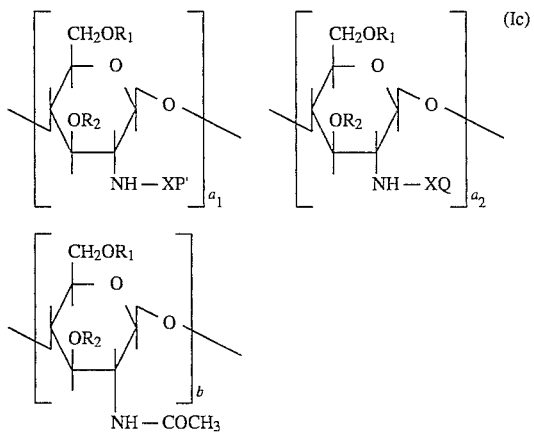

wherein $R_1$ and $R_2$ individually mean H or carboxymethyl group; with the proviso that $R_1$ and $R_2$ do not stand for H at the same time, X represents a peptide chain containing two to six amino acids and terminated by —NH— towards P' or Q, where P' denotes an alkoxycarbonyl group or an aralkyloxycarbonyl group serving as an amino-protecting group and where Q stands for H, or X represents a chain of the formula $$-(Suc)-X'-$$

where Suc means the succinic acid residue of the formula —OC—$CH_2$—$CH_2$—CO— and X' means a peptide chain containing two to six amino acids and terminated by —CO— towards P' or Q, where P' denotes a lower alkoxyl group or an aralkyloxy group or a lower alkylimino group serving as a carboxyl-protecting group and where Q stands for a group —OH, $a_1$ and $a_2$ individually represent a positive integer, and b stands for a positive integer; and wherein $a_1$, $a_2$ and b are selected so that said N-acetylcarboxymethylchitosan derivative has the following characteristic values (1)–(4):

| | | |
|---|---|---|
| (1) | carboxymethylation degree: | 0.5–1.2 |
| (2) | molecular weight (as measured by gel filtration method): | 3,000–300,000 |
| (3) | $a/(a + b)$: [provided that $a = a_1 + a_2$] | 0.01–1 |
| (4) | P'X ratio (molar ratio): | 0.01–1. |

5. An N-acetylcarboxymethylchitosan derivative according to claim 4, wherein X present in XP' means a peptide chain composed of 1–4 amino acids and P' is bonded to an —NH-terminated amino acid of said peptide chain.

6. An N-acetylcarboxymethylchitosan derivative according to claim 4, wherein XP' means one of the following:

P'-Phe-Phe-Gly-,
P'-Gly-Phe-Gly-Gly- (SEQ ID NO:1),
P'-Phe-Gly-Phe-Gly- (SEQ ID NO:2),
P'-Gly-Phe-Gly-Phe- (SEQ ID NO:3),
P'-Gly-Gly-Gly-, or
P'-Ala-Gly-Gly-Gly- (SEQ ID NO:4), and P' means an alkoxycarbonyl group or an aralkyloxycarbonyl group serving as the amino-protecting group which is bonded to the —NH-terminated amino acid of the peptide chain.

7. An N-acetylcarboxymethylchitosan derivative according to claim 4, wherein X' means a peptide chain composed of 1–4 amino acids and P' is bonded to a —CO-terminated amino acid of said peptide chain.

8. An N-acetylcarboxymethylchitosan derivative according to claim 4, wherein XP' is selected from the group consisting of:

-(Suc)-Ala-Ala-Ala-P' and
-(Suc)-Ala-Ala-Val-Ala-P' (SEQ ID NO:5)

in which Suc represents the succinic acid residue and P' means a lower alkoxy group serving as a carboxyl-protecting group which is bonded to the —CO-terminated amino acid of the peptide chain.

9. An —N-acetylcarboxymethylchitosan derivative according to claim 4, wherein P' is a tert-butoxycarbonyl group, a p-methoxybenzyloxycarbonyl group, or a tertbutyloxy group.

10. A partially N-acetylated carboxymethylchitosan derivative represented by the following formula (IIa):

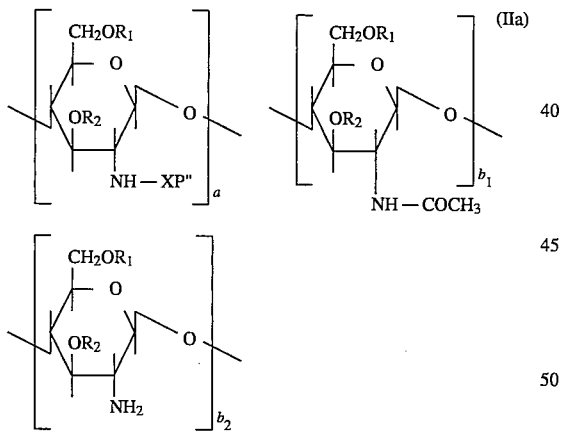

wherein $R_1$ and $R_2$ individually mean H or carboxymethyl group; with the proviso that $R_1$ and $R_2$ do not stand for H at the same time, X represents a peptide chain containing two to six amino acids and terminated by —NH— towards P'', where P'' denotes a hydrogen atom, an alkoxycarbonyl group or'' an aralkyloxycarbonyl group serving as an amino-protecting group, or X represents a chain of the formula —(Suc)—X'— where Suc means the succinic acid residue of the formula

—O—CH$_2$—CH$_2$—CO— and X' means a peptide chain containing two to six amino acids and terminated by —CO— towards P'' where P'' denotes a hydroxyl group, a lower alkoxyl group or an aralkyloxy group or a lower alkylimino group serving as a carboxyl-protecting group, and a, $b_1$ and $b_2$ individually represent a positive integer; and wherein a, $b_1$ and $b_2$ are selected so that said N-acetylated carboxymethylchitosan derivative has the following characteristic values (1)–(4):

| | | |
|---|---|---|
| (1) | carboxymethylation degree: | 0.5–1.2 |
| (2) | molecular weight (as measured by gel filtration method): | 3,000–300,000 |
| (3) | a/(a + b): [provided that b = $b_1$ + $b_2$] | 0.01–1 |
| (4) | P''/X ratio (molar ratio): | 0.1–1. |

11. An N-acetylcarboxymethylchitosan derivative represented by the following formula (Xa) or (XIa):

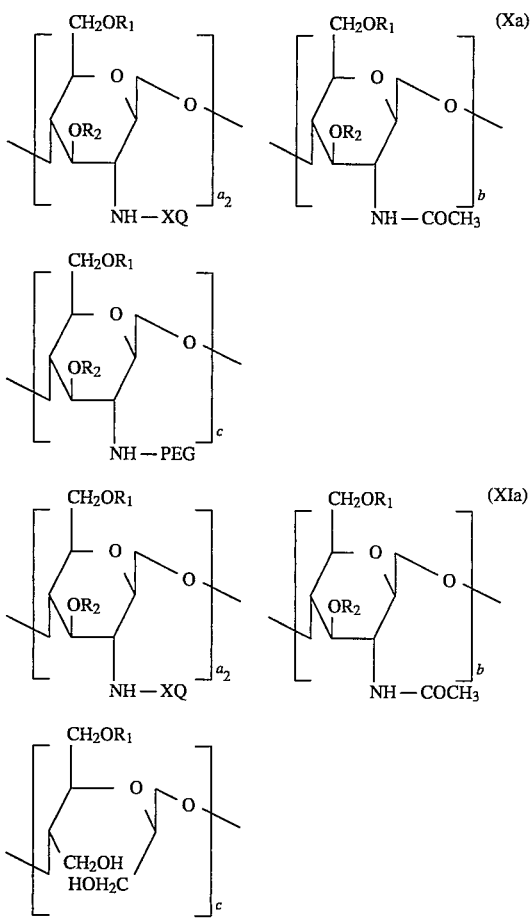

wherein $R_1$ and $R_2$ individually mean H or carboxymethyl group with the proviso that $R_1$ and $R_2$ do not stand for H at the same time, X represents a peptide chain containing two to six amino acids and terminated by —NH— towards Q, where Q stands for H, or X represents a chain of the formula —(Suc)—X'— where Suc means the succinic acid residue of the formula —OC—CH$_2$—Ch$_2$—CO— and X' means a peptide chain containing two to six amino acids and terminated by —CO— towards Q, where Q stands for a group —OH, $a_2$ represents a positive integer, and b and c individually stand for a positive integer, and -PEG represents a group having the following formula (VI), (VII), (VIII) or (IX):

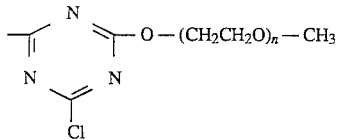
(VI)

—CO—CH$_2$CH$_2$—CO—O—(CH$_2$CH$_2$O)$_n$—CH$_3$ (VII)

—CO—O—(CH$_2$CH$_2$O)$_n$—CH$_3$ (VIII)

—CO—CH$_2$—O—(CH$_2$CH$_2$O)$_n$—CH$_3$ (IX)

in which n means the average polymerization degree of the polyethylene glycol chain; and wherein $a_2$, b and c are selected so that said N-acetylcarboxymethylchitosan derivative has the following characteristic values (1)–(3):

| (1) | carboxymethylation degree: | 0.5–1.2 |
| (2) | molecular weight (as measured by gel filtration method): | 3,000–300,000 |
| (3) | $a_2/(a_2 + b + c)$: | 0.01–1. |

\* \* \* \* \*

SEQUENCE LISTING ( 1 ) GENERAL INFORMATION:

( i i i ) NUMBER OF SEQUENCES: 20

( 2 ) INFORMATION FOR SEQ ID NO:1:

( i ) SEQUENCE CHARACTERISTICS:
      ( A ) LENGTH: 4 amino acids
      ( B ) TYPE: amino acid
      ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:1:

Gly  Phe  Gly  Gly
   1

( 2 ) INFORMATION FOR SEQ ID NO:2:

( i ) SEQUENCE CHARACTERISTICS:
      ( A ) LENGTH: 4 amino acids
      ( B ) TYPE: amino acid
      ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:2:

Phe  Gly  Phe  Gly
   1

( 2 ) INFORMATION FOR SEQ ID NO:3:

( i ) SEQUENCE CHARACTERISTICS:
      ( A ) LENGTH: 4 amino acids
      ( B ) TYPE: amino acid
      ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:3:

Gly  Phe  Gly  Phe
   1

( 2 ) INFORMATION FOR SEQ ID NO:4:

( i ) SEQUENCE CHARACTERISTICS:
      ( A ) LENGTH: 4 amino acids
      ( B ) TYPE: amino acid
      ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:4:

Ala Gly Gly Gly
1

( 2 ) INFORMATION FOR SEQ ID NO:5:

( i ) SEQUENCE CHARACTERISTICS:
( A ) LENGTH: 4 amino acids
( B ) TYPE: amino acid
( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:5:

Ala Ala Val Ala
1

( 2 ) INFORMATION FOR SEQ ID NO:6:

( i ) SEQUENCE CHARACTERISTICS:
( A ) LENGTH: 5 amino acids
( B ) TYPE: amino acid
( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:6:

Gly Gly Gly Val Ala
1               5

( 2 ) INFORMATION FOR SEQ ID NO:7:

( i ) SEQUENCE CHARACTERISTICS:
( A ) LENGTH: 5 amino acids
( B ) TYPE: amino acid
( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:7:

Gly Gly Gly Leu Ala
1               5

( 2 ) INFORMATION FOR SEQ ID NO:8:

( i ) SEQUENCE CHARACTERISTICS:

(A) LENGTH: 5 amino acids
(B) TYPE: amino acid
(D) TOPOLOGY: linear (ii) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:8:

Gly Gly Phe Leu Gly
1               5

(2) INFORMATION FOR SEQ ID NO:9:

(i) SEQUENCE CHARACTERISTICS:
(A) LENGTH: 5 amino acids
(B) TYPE: amino acid
(D) TOPOLOGY: linear (ii) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:9:

Gly Gly Phe Tyr Ala
1               5

(2) INFORMATION FOR SEQ ID NO:10:

(i) SEQUENCE CHARACTERISTICS:
(A) LENGTH: 5 amino acids
(B) TYPE: amino acid
(D) TOPOLOGY: linear (ii) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:10:

Gly Gly Gly Gly Gly
1               5

(2) INFORMATION FOR SEQ ID NO:11:

(i) SEQUENCE CHARACTERISTICS:
(A) LENGTH: 6 amino acids
(B) TYPE: amino acid
(D) TOPOLOGY: linear (ii) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:11:

Gly Gly Gly Phe Leu Gly
1               5

( 2 ) INFORMATION FOR SEQ ID NO:12:

( i ) SEQUENCE CHARACTERISTICS:
        ( A ) LENGTH: 6 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:12:

Gly Gly Gly Gly Leu Ala
    1                    5

( 2 ) INFORMATION FOR SEQ ID NO:13:

( i ) SEQUENCE CHARACTERISTICS:
        ( A ) LENGTH: 6 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:13:

Gly Gly Gly Gly Gly Gly
    1                    5

( 2 ) INFORMATION FOR SEQ ID NO:14:

( i ) SEQUENCE CHARACTERISTICS:
        ( A ) LENGTH: 7 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:14:

Gly Gly Gly Gly Phe Leu Gly
    1                    5

( 2 ) INFORMATION FOR SEQ ID NO:15:

( i ) SEQUENCE CHARACTERISTICS:
        ( A ) LENGTH: 7 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:15:

Gly Gly Gly Gly Gly Gly Gly
1               5

( 2 ) INFORMATION FOR SEQ ID NO:16:

( i ) SEQUENCE CHARACTERISTICS:
        ( A ) LENGTH: 7 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:16:

Gly Gly Gly Gly Gly Leu Ala
1               5

( 2 ) INFORMATION FOR SEQ ID NO:17:

( i ) SEQUENCE CHARACTERISTICS:
        ( A ) LENGTH: 8 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:17:

Gly Gly Gly Gly Gly Phe Leu Gly
1               5

( 2 ) INFORMATION FOR SEQ ID NO:18:

( i ) SEQUENCE CHARACTERISTICS:
        ( A ) LENGTH: 8 amino acids
        ( B ) TYPE: amino acid
        ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( x i ) SEQUENCE DESCRIPTION: SEQ ID NO:18:

Gly Gly Gly Gly Gly Gly Gly Gly
1               5

( 2 ) INFORMATION FOR SEQ ID NO:19:

( i ) SEQUENCE CHARACTERISTICS:
        ( A ) LENGTH: 9 amino acids
        ( B ) TYPE: amino acid
        ( D ) TOPOLOGY: linear ( i i ) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:19:

Gly Gly Gly Gly Gly Gly Gly Gly Gly
1               5

(2) INFORMATION FOR SEQ ID NO:20:

(i) SEQUENCE CHARACTERISTICS:
   (A) LENGTH: 10 amino acids
   (B) TYPE: amino acid
   (D) TOPOLOGY: linear (ii) MOLECULE TYPE: peptide (iii) HYPOTHETICAL: NO (iv) ANTI-SENSE: NO (v) FRAGMENT TYPE: N-terminal (xi) SEQUENCE DESCRIPTION: SEQ ID NO:20:

Gly Gly Gly Gly Gly Gly Gly Gly Gly Gly
1               5                   10